US012677018B2

(12) United States Patent
Appiah et al.

(10) Patent No.: US 12,677,018 B2
(45) Date of Patent: Jul. 7, 2026

(54) AUDIENCE AND RETURN RECOMMENDATION USING LOOK ALIKE AUDIENCE CHARACTERISTICS

(71) Applicant: Oracle International Corporation, Redwood Shores, CA (US)

(72) Inventors: Frank Appiah, Broomfield, CO (US); Jason Canney, Broomfield, CO (US)

(73) Assignee: Oracle International Corporation, Redwood Shores, CA (US)

( * ) Notice: Subject to any disclaimer, the term of this patent is extended or adjusted under 35 U.S.C. 154(b) by 76 days.

(21) Appl. No.: 18/429,083

(22) Filed: Jan. 31, 2024

(65) Prior Publication Data

US 2025/0247574 A1     Jul. 31, 2025

(51) Int. Cl.
| | |
|---|---|
| *H04N 21/214* | (2011.01) |
| *G06Q 30/0202* | (2023.01) |
| *H04N 21/24* | (2011.01) |
| *H04N 21/25* | (2011.01) |
| *H04N 21/258* | (2011.01) |
| *H04N 21/43* | (2011.01) |
| *H04N 21/442* | (2011.01) |
| *H04N 21/475* | (2011.01) |
| *H04N 21/482* | (2011.01) |

(52) U.S. Cl.
CPC ... *H04N 21/25866* (2013.01); *G06Q 30/0202* (2013.01); *H04N 21/252* (2013.01)

(58) Field of Classification Search
None
See application file for complete search history.

(56) References Cited

U.S. PATENT DOCUMENTS

| | | | |
|---|---|---|---|
| 2017/0111461 A1 | 4/2017 | Kelman et al. | |
| 2019/0034973 A1* | 1/2019 | Yao | G06Q 30/0269 |
| 2019/0102802 A1* | 4/2019 | Tuschman | G06N 20/20 |
| 2019/0259041 A1 | 8/2019 | Jackson | |
| 2021/0201359 A1 | 7/2021 | Sekar et al. | |

(Continued)

OTHER PUBLICATIONS

U.S. Appl. No. 18/429,093, filed Jan. 31, 2024.

(Continued)

*Primary Examiner* — Brian T Pendleton
*Assistant Examiner* — Jean D Saint Cyr
(74) *Attorney, Agent, or Firm* — Invoke

(57)                 ABSTRACT

The system and methods for audience and return recommendation for targeted content items using machine learning and similarity models. The method includes receiving an input dataset comprising of an input audience or specified constraints on the targeted content items. A join operation augments the input dataset by adding individual characteristics data. A trained machine model generates an engagement score for each individual and by using a threshold on the engagement score each individual is classified into a tier category. Based on the engagement level a target audience is generated. Using a similarity model, an expanded audience is generated which increases the size of the target audience by adding similar individuals from the reference audiences. A return is computed using the individuals in the expanded audience while meeting the specified constraints. The expanded audience and return for the targeted content items are returned to the client device.

20 Claims, 14 Drawing Sheets

100

(56)    References Cited

U.S. PATENT DOCUMENTS

| | | |
|---|---|---|
| 2023/0177543 A1 | 6/2023 | Huang et al. |
| 2024/0185062 A1* | 6/2024 | Charnock ................ G06N 3/08 |
| 2025/0156641 A1* | 5/2025 | Tang ....................... G06F 40/30 |

OTHER PUBLICATIONS

Final Office Action notified Aug. 6, 2025 for U.S. Appl. No. 18/429,093.

Non-Final Office Action for U.S. Appl. No. 18/429,093, dated Jan. 28, 2025.

* cited by examiner

Figure 9A:
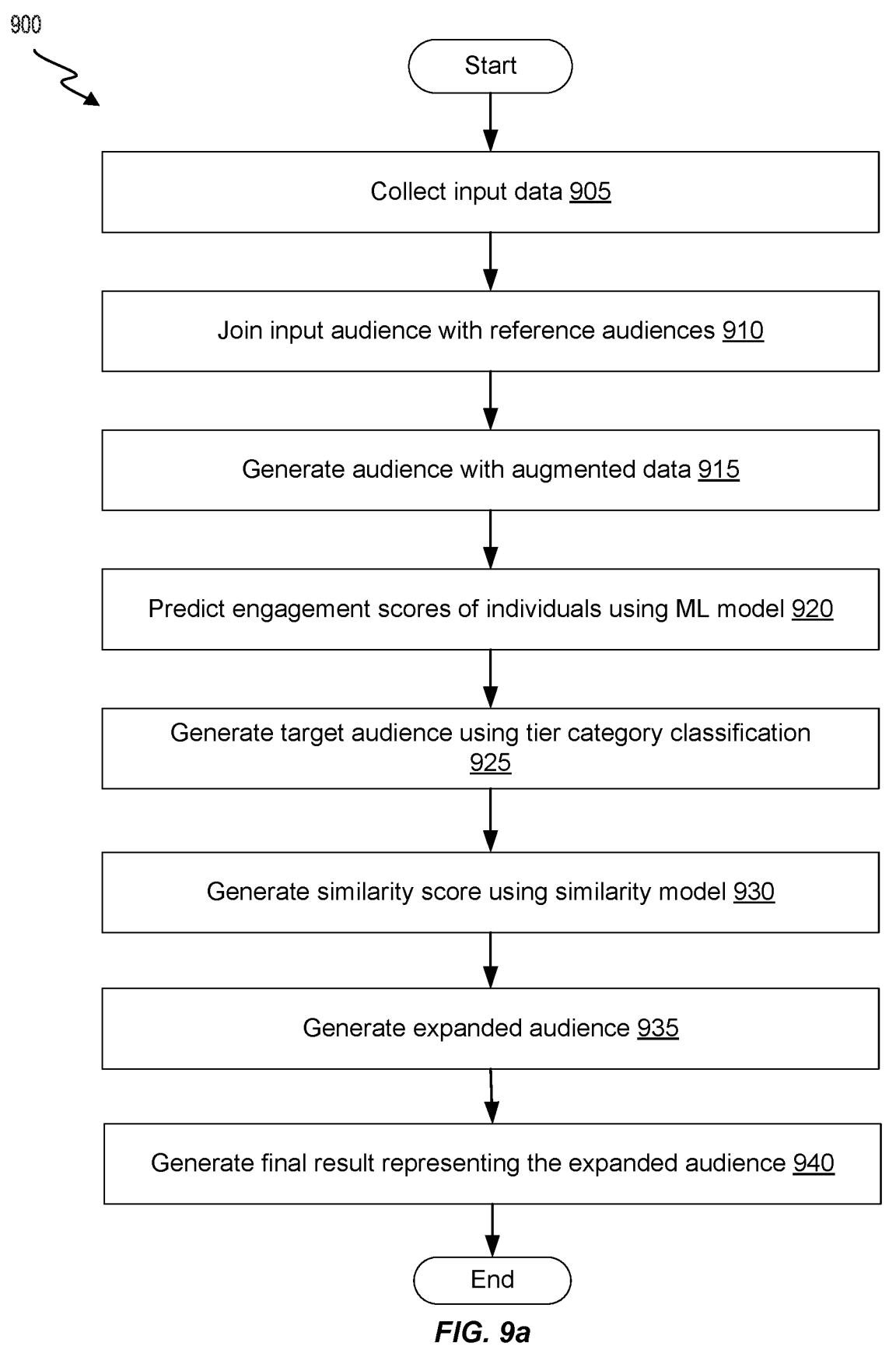

900

Start

Collect input data 905

Join input audience with reference audiences 910

Generate audience with augmented data 915

Predict engagement scores of individuals using ML model 920

Generate target audience using tier category classification 925

Generate similarity score using similarity model 930

Generate expanded audience 935

Generate final result representing the expanded audience 940

End

AUDIENCE AND RETURN RECOMMENDATION USING LOOK ALIKE AUDIENCE CHARACTERISTICS

BACKGROUND

Targeted content items are used by the multimedia content sharing applications and services that provide different types of multimedia content, such as video, audio, image, text, print, to a large user's base using the web enabled media applications and services on computing devices. Targeted content items can be tailored, using human insights intelligence, to the requirements of groups of individuals or individuals so that success and impact of a marketing campaign can be increased. The human insights intelligence-based strategy can achieve a number of strategic objectives during a planned marketing campaign that can include but are not limited to establish a new customers' base in existing or new geolocations, reinforce an existing customer base, or increase sales to the customers by pushing relevant content in the suitable format.

Individuals are typically presented with a large set of content items in different formats, but they only show interest in a relatively small number of content items that are pushed to them. One explanation for this low rate can be attributed to the fact that the contents are not tailored to the intended users base as they are usually broadcasted.

One potential solution can be to identify relevant individuals for the content items by creating social graphs methods that model sematic relations between users and their interests. This can help content providers to push targeted media content items to users who have interest in them or present the content items in the search results to the users. Resultantly, this can enable content providers to push content items to individuals or groups of individuals who might interact with the pushed content with a high probability. They may also want to search for targeted content items that could be relevant or similar to a product, entity or service that is being targeted. Taking an audience-centered approach may improves the effectiveness of the content if it is created for and delivered to the right audience.

This approach is efficient and effective compared to the ones where the potential audience is identified through extensive research and subsequently the process of filtering the targeted audience is manually done, which can be significantly costly in terms of time and resources. This is equally challenging both for new content providers and content providers creating new content.

SUMMARY

In some embodiments, a computer-implemented method is provided to determine audience recommendation using machine learning and similarity models for targeted content items. The method includes receiving input dataset from a client device comprising of input audience, one or more specified constraints or a delta of changes, if any, called gain delta of changes on targeted content items. An audience is composed of a set of individuals identifiers (IDs) belonging to a type of audience, where individual IDs uniquely identify a specific individual in the audience. The type of audience refers to a product or service in targeted content items and may include frozen pizza buyers, coca cola buyers, or bud light buyers etc. The one or more specified constraints comprise of receiving an indication of a maximum dollar amount to be spent on one or more targeted content items. The delta of changes on the targeted content items may be a difference between gain and expense associated with one or more targeted content items. The method augments the input dataset by taking a join of the set of individual IDs in an input audience with a set of individual IDs in a set of reference audiences stored on a cloud system. A reference audience in the set of reference audiences can be individuals corresponding to a type of audience along with a set of individual characteristic data. In the join operation, the method adds to the input dataset the set of individual characteristics data for each matched individuals belonging to input audience with the individuals belonging to the set of reference audiences. Individual characteristic data includes demographic data, psychographic or behavioral characteristic data etc. which may be used to train a machine learning model and/or underlying algorithms.

The method may also generate an engagement score for each individual belonging to the input audience by processing the input dataset with the augmented data using trained machine learning model. The machine learning model is trained on the Individual characteristic data of each individual belonging to the set of reference audiences stored on the cloud system. Any supervised machine learning model (e.g. Deep Neural network, logistic regression) can be used. By studying the various patterns of the individual characteristics data, the model generates predictions of engagement scores to determine the level of engagement of individuals with the targeted content items. The engagement score is a probability of engagement of the individual with the targeted content items.

In some embodiments, each individual is assigned a tier category from a set of tier categories by using a given threshold value on the engagement scores of each individual belonging to the audience. The method identifies a target audience that includes a subset of the set of individuals belonging to a specific tier category of the set of tier categories. For example, target audience may include subset of individuals belonging to medium or high tier categories based on the threshold values used for the engagement scores. An expanded audience is generated using a similarity model based on a similarity score for each individual belonging to the target audience with the set of individuals belonging to the set of reference audiences. The similarity score measures the similarity between each individual belonging to the target audience with the set of individuals belonging to the set of reference audiences and includes Jaccard similarity metric, an Overlap Coefficient metric or a Sorensen-Dice coefficient metric. The similarity model may include item based collaborative filtering or users based collaborative filtering models. Based on the specified constraints, a return on the targeted content items using an objective function is calculated. The method further includes outputting result to the client device where a result can include expanded audience, return on targeted content items or targeted content items that can be activated for the expanded audience.

In some embodiments, a computer-implemented method is provided. An input dataset is received from a client device. The input data set includes a first set of individual identifiers (IDs) corresponding to an audience. The audience is composed of a set of individuals belonging to a type of audience. The input dataset is augmented by taking a join of the first set of individual IDs of the audience with a second set of individual IDs in a set of reference audiences stored within a cloud system. The join adds in the input dataset a set of individual characteristics data of each matched individual of the first set of individual IDs of the audience with the second set of individual IDs in the set of reference audiences. An engagement score is generated for each individual in the first set of individual IDs by processing the input dataset with augmented data using a trained machine learning model, where the engagement score is a probability of engagement of the individual with one or more targeted content items and wherein a machine learning model is trained using the individual characteristics data of the second set of individual IDs in the set of reference audiences. Each individual in the first set of individual IDs is assigned to a tier category from a set of tier categories by using a threshold value on the engagement score generated by the machine learning model. A target audience is identified, where the target audience comprises of a subset of the first set of individual IDs belonging to a particular tier category of the set of tier categories. A similarity score is computed using a similarity model for each individual belonging to the target audience with the second set of individual IDs in the set of reference audiences, using the individual characteristics data. An expanded audience is generated based on the similarity scores, where the expanded audience comprises of individuals belonging to the target audience and the subset of individuals from the set of reference audiences, wherein the subset of individuals from the set of reference audiences are selected above a threshold value on the similarity score. A result that includes the expanded audience is output to the client device.

The individual characteristic data may include demographic data. The trained machine learning model may include a Deep Neural Network model, a Support Vector machine model or a Logistic Regression model. The set of tier categories may include low, medium or high tier categories with respect to the engagement of individuals with the targeted content items. The similarity score may include a Jaccard similarity metric, an Overlap Coefficient metric or a Sorensen-Dice coefficient metric. The similarity model may include items based collaborative filtering or users based collaborative filtering.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product tangibly embodied in a non-transitory machine-readable storage medium, including instructions configured to cause one or more data processors to perform part or all of one or more methods or processes disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures:

FIG. 9*a* and FIG. 9*b* illustrates an example flow of a method for obtaining final output result of an expanded audience and return on targeted content items to activate respectively using machine learning and similarity model in accordance with some embodiments of the present disclosure.

DETAILED DESCRIPTION

Figure 1:
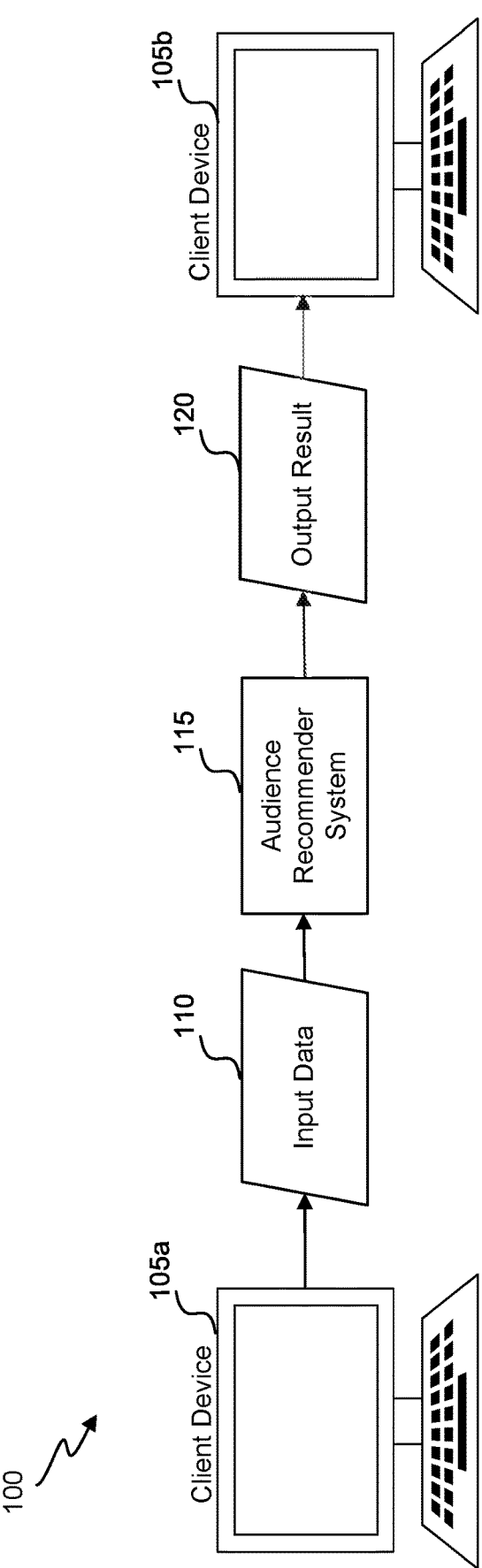
FIG. 1 is a block diagram illustrating an overview of a system that may be utilized for audience recommendations from input data, in accordance with an embodiment of the present disclosure.

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as outlined in the appended claims.

In some embodiments of the present disclosure, techniques are provided to use machine-learning models and similarity models for audience and return recommendation for targeted content items. Extract, Transform, and Load (ETL) processes may be used for collecting an input dataset from a client device. The input dataset includes an audience and/or one or more specified constraints on the targeted content items. An audience refers to a set of individuals having a set of common characteristics, which may be selected from demographics, purchasing behaviors, and interests. The audience in the input dataset comprises of a set of individuals uniquely identified by respective set of individual identifiers (IDs) that belong to a type of audience. A data element in the input dataset may include (for example) a text string (e.g. string identifying the type of audience such as Frozen Pizza) and numeric data (e.g. individual identifiers of the individuals belonging to the audience). The type of audience includes specific products or services. For example, input audience of frozen pizza type comprises of individual IDs of buyers for frozen pizza product and input audience of Coca Cola™ type comprises of individual IDs of buyers for Coca Cola™ product respectively. The one or more specified constraints includes indication of a maximum dollar amount to be spent on one or more targeted content items and/or a gain delta of changes. The gain delta of changes comprises of constraints on the difference between gain and expense associated with one or more targeted content items.

Embodiments of the present disclosure may be utilized for performing a join operation of the individual IDs of the audience in the input dataset with the individual IDs in a set of reference audiences stored within a cloud system. The set of reference audiences comprises of individual IDs belonging to different types of audiences and associated individual characteristics data. The join operation adds individual characteristic data in the input dataset for each matched individual in the input dataset with the individuals belonging to the set of reference audiences. Individual characteristic data includes demographic data, psychographic or behavioral characteristic data etc. The input dataset with the augmented individual characteristic data is used by a trained machine learning model to generate an engagement score of each individual in the input dataset. A machine learning model is trained on the individual characteristic data of individual IDs belonging to the set of reference audiences. The engagement score measures the probability of engagement of individual with the targeted content item. Based on the engagement score, each individual is classified into a tier category by using a threshold on the engagement score. The tier category from a set of tier categories may include low, medium or high categories based on the level of the engagement score.

In some embodiments, a target audience can be generated by taking a subset of the individual IDs belonging to a particular tier category based on the predicted engagement scores. For example, the target audience can comprise of individual IDs of medium or high tier categories. The target audience showcases the audience-centered approach of the present disclosure by identifying the individuals that have a high probability of being engaged with one or more targeted content items. For each individual belonging to the target audience, a similarity score may be computed using a similarity model based on the individual characteristic data with the individuals belonging to the set of reference audiences. Based on the similarity scores, an expanded audience may be generated where the expanded audience increases the size of the target audience. The expanded audience comprises of the individual IDs belonging to the target audience and the subset of individuals from the set of reference audiences similar to the individuals of the target audience. The expanded audience identifies the individuals from the universe of the set of reference audiences who are likely to be interested in the service or product. Targeting the individuals in the expanded audience may help the content items reach the right individuals who may relate more to the content provider's message and products. The present disclosure may be helpful in providing business insights and data enrichment services for various businesses to identify where to spend money on content items, how to appeal to consumers, how to identify new segments, and make informed decisions.

Audience targeting is the practice of using data to segment consumers by demographics, behavior, or interests to reach consumers who are interested in products or services with targeted messaging or content items. It involves identifying the audience and adapting the targeted content items to their interests, level of education and understanding, behavior, attitude, and beliefs. It decreases the probability of wasting the spend on targeted content items' that may target not relevant consumers and can help in finding potential individuals that might be relevant to the content items and eventually may show interest in it by clicking the content items, resulting in maximizing the return on investment on the targeted content items. Resultantly, this can enable content providers to push content items to individuals or groups of individuals who might interact with the pushed content with a high probability. They may also want to search for targeted content items that could be relevant or similar to a product, entity or service that is being targeted. This shows the power of taking an audience-centered approach, as it improves the effectiveness of the content if it is created for and delivered to the right audience.

In some embodiments, techniques are provided for audience recommendation for targeted content items. An input dataset comprising of a set of individual identifiers (IDs) corresponding to an audience, one or more specified constraints on the targeted content items is provided. The method augments the audience by taking a join operation of the individual IDs of the audience with the individual IDs in a set of reference audiences within a cloud system, where the join operation augments the audience with a set of individual characteristics data of each matched individual from the set of reference audiences. The method employs a trained machine learning model on the individual characteristics data of the set of individuals in the set of reference audiences as input variables and generates an engagement score for each individual of the set of individuals.

The method uses thresholds values for the engagement scores of each individual in the set of individuals to generate target audience by classifying each individual in the audience a tier category signifying the level of engagement of each individual. The method generates an expanded audience using a similarity model based on a similarity score for each individual belonging to the target audience, where expanded audience increases the size of the target audience and comprises of individuals from at least one other reference audience in the set of reference audiences with similar characteristics to the individuals who belong to the target audience. Based on the expanded audience, specified constraints and gain delta received from the client device, a return is calculated for the targeted content items. The method generates a result comprising of recommended expanded audience, return on the targeted content items or targeted content items to activate for the expanded audience.

FIG. 1 is the block diagram illustrating the overview of the system that may be utilized for determining audience recommendations from input data, in accordance with an example implementation. An audience refers to a set of individuals having a set of common characteristics, which may be selected from demographics, purchasing behaviors, and interests. A computer-implemented method 100 receives an input data 110 from a client device 105*a*. The input data 110 is passed on to an audience recommender system 115 to generate an output result 120 which is then displayed to a client device 105*b*. 105*a* and 105*b* may be the same client devices or may comprise of different client devices comprising of one or more computer systems. The one or more computers in the client device 105*a* or 105*b* may be client terminal in communication with one or more servers, or personal digital/data assistants (PDA), laptop computers, mobile computers, internet appliances, one or two-way pagers, mobile phones, or other similar desktop, mobile or smart phones or hand-held electronic devices.

The computer system in the client device 105*a* or 105*b* of the computer-implemented method 100 includes a processing system with one or more high-speed Central Processing Unit(s) ("CPU"), processors and one or more memories. The computer system in the client device 105*a* or 105*b* may also include a memory for storing a plurality of processing modules or logical instructions that are executed by the one or more processors coupled. The computer memory that stores data may also be maintained on a computer readable medium including magnetic disks, optical disks, organic memory, and any other Volatile (e.g., Random Access Memory ("RAM)) or non-volatile (e.g., Read-Only Memory ("ROM), flash memory, etc.) mass storage system readable by the CPU. The computer readable medium includes cooperating or interconnected computer readable medium, which exists exclusively on the processing system or can be distributed among multiple interconnected processing systems that may be local or remote to the processing system.

Besides processor and memory, the computer system in the client device 105*a* or 105*b* may also include user input and output components, such as a keyboard, mouse, stylus, and a display/touchscreen. For instance, the computer system in client device 105*a* may provide a means for inputting the input data 110 to memory. Input data 110 may include input audience comprising of individual identifiers (IDs), specified constraints or gain delta of changes on the targeted content items, where individual IDs uniquely identify a specific individual in the audience. The audience is a set of individuals belonging to a type of audience who can be engaged with a particular targeted content item. The type of audience includes frozen pizza buyers, coca cola buyers, or bud light buyers etc. The specified constraints comprise of receiving a specified indication of a maximum dollar amount to be spent on one or more targeted content items. The gain delta of changes comprises of a difference between gain and expense associated with one or more targeted content items.

The audience recommender system 115 processes the data received from the input data 110 and generates the output result 120 comprising of expanded audience, return for the expanded audience and targeted content items to activate which are then communicated to the client device 105*b*.

Figure 2:
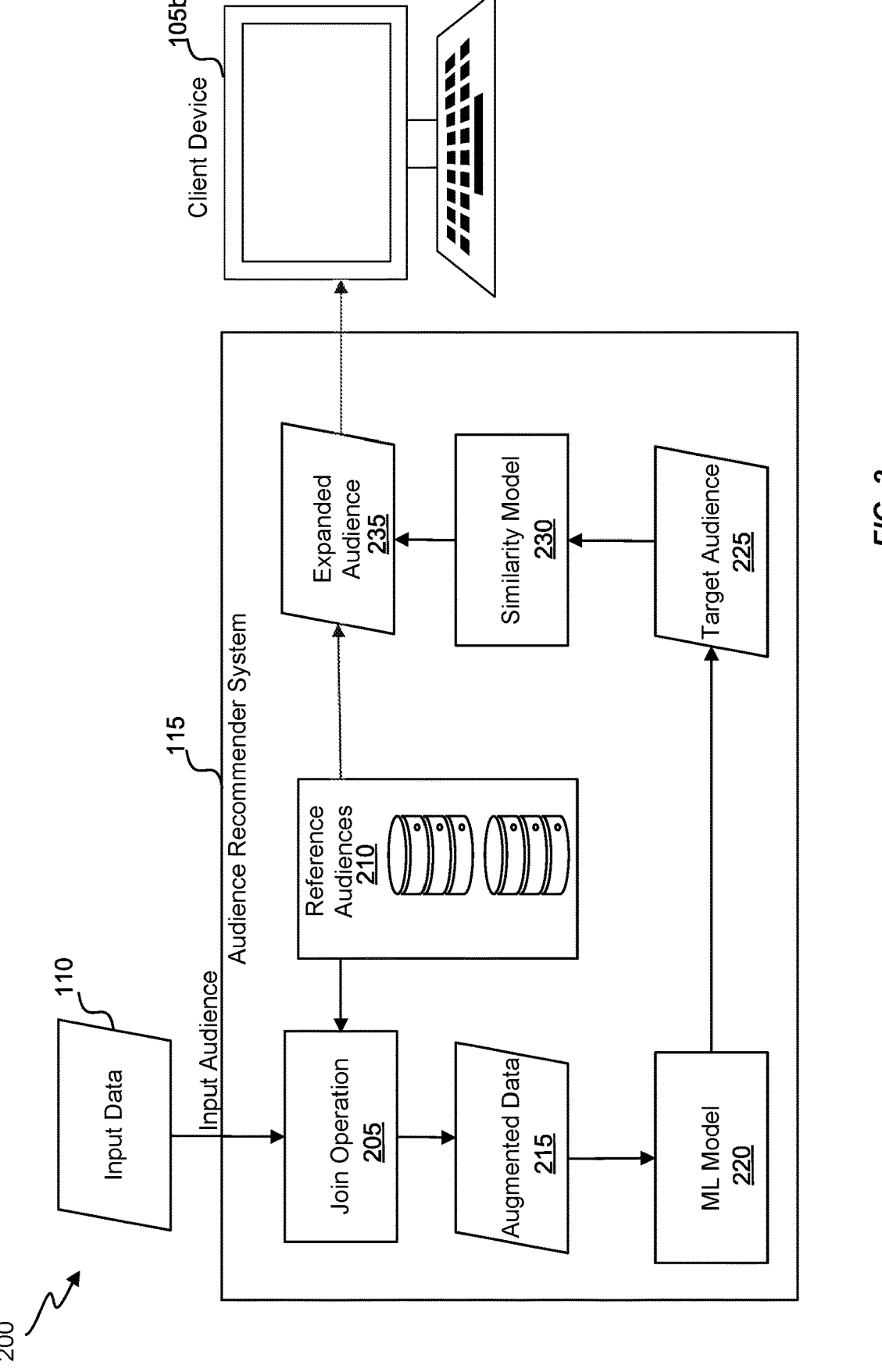
FIG. 2 is a block diagram illustrating generation of expanded audience from an input audience in input data using similarity and ML model in accordance with some embodiments of the disclosure.

FIG. 2 illustrates generation 200 of the expanded audience from input audience in the input data 110 using similarity and ML models in accordance with some embodiments of the disclosure. The example embodiment for the generation of the expanded audience includes the input data 110, a join operation 205, reference audiences 210, an augmented data 215, a ML model 220 (machine learning model), a target audience 225, a similarity model 230, the expanded audience 235, and the client device 105*b*. One or more input audiences can be collected from input data 110, where input audience comprises of individual IDs belonging to the specific type of audience. The type of audience includes specific products or services. For example, input audience of frozen pizza type comprises of individual IDs of buyers for frozen pizza product and input audience of Coca Cola™ type comprises of individual IDs of buyers for Coca Cola™ product respectively. The data in input audience may include text data identifying the type of the audience or numeric data identifying the individual IDs belonging to the input audience. One or more input audiences of one or more types are then passed on to the audience recommender system 115 for further processing.

The input audience from the input data 110 is processed by the audience recommender system 115. Join operation 205 performs a join of the set of individual IDs of the input audience with the set of individual IDs in the reference audiences 210 stored within a cloud system. The reference audiences 210 comprises of individuals belonging to different types of audiences and stores individual data for each individual. The individual data comprises of individual IDs uniquely identifying each individual belonging to the audience along with the individual characteristics data for every individual in the reference audiences 210 is stored. Individual characteristic data includes demographic data, psychographic or behavioral characteristic data etc. The demographic data comprises of the information about the individuals according to certain attributes such as age, sex, place of residence and may also include socioeconomic factors such as occupation, family status or income etc. The psychographic data comprises of information about individual's values, attitudes, interest, and personality traits that are used to build a profile of how an individual views the world, the things that interests them and what triggers motivate them to action. Behavioral data comprises of information about the individual's interaction with the products or services. Examples of behavioral data may include website views, newsletter sign-ups, adding an item to a shopping cart, creating an account on product or service site, linking a social media post, or downloading an app. join operation 205 augments the input data 110 by adding the individual characteristics data from the reference audiences 210 for each matched individual of input audience with the set of individuals in the set of reference audiences. The join operation 205 may include performing left outer join operation 205 using the individuals in the input audience and set of individuals in the set of reference audiences, where the resulting data comprises of the individuals from the input audience and the matching individuals from the set of reference audiences. The join operation 205 may perform inner join using the individuals in the input audience and set of individuals in the set of reference audiences, where the resulting data comprises of the individuals matching in the input audience and set of individuals in the set of reference audiences.

The augmented data 215 receives the augmented data 215 from the join operation 205. The augmented data 215 comprises of individual IDs belonging to the input audience and augmented individual characteristics data added from the reference audiences 210 for each matched individual of input audience with the set of individuals in the set of reference audiences. The ML model 220 receives augmented data 215 and uses individual characteristics data of each individual in the reference audiences 210 to train a machine learning model. The model uses historical data to identify patterns and relationships present in the data. The machine learning model is trained on the features of individual characteristics data of the individuals in the reference audiences 210 and is based on learned correlations between features of individual characteristics data. The machine learning algorithm may learn which features strongly correlate and affect the prediction of individual engagement with the targeted content items. Any supervised machine learning model can be deployed. Examples of supervised machine learning models that can be used include Deep Neural Network models, Logistic Regression, Support Vector Machine etc. The machine learning model predicts engagement score for each individual as an output where engagement score measures the probability of individual engagement with the targeted content items.

The target audience 225 comprises of a subset of individuals belonging to a particular tier category in the set of tier categories. For example, the target audience 225 may comprise of the individuals in the medium or high tier category based on the predicted engagement scores. The target audience 225 thus selects the individuals that have a high probability of being engaged in the targeted content items and can be individuals of interest that are more likely to convert viewers that engage with the content into viable sales leads.

The similarity model 230 computes a similarity score for each individual belonging to the target audience 225 with the set of individuals in the set of reference audiences. The similarity score may include a Jaccard similarity metric, an Overlap Coefficient metric or a Sorensen-Dice coefficient metric. For example, the Jaccard similarity metric can be used to generate similarity score of each individual with the individuals in the reference audiences 210 using individual characteristics data of each individual. The Jaccard similarity metric measures the similarity between two sets of data to see which member characteristics are shared and which are distinct. The first set may be the individuals in the target audience 225 and the second set may be the individuals in the set of reference audiences. The Jaccard similarity is calculated as the size of the intersection divided by the size of the union of the two sets. Higher values of similarity score of a particular individual means that the individual in the target audience 225 has significant similarities in the individual characteristics data with the individual in the reference audiences 210. The Overlap Coefficient metric is a similarity measure that measures the overlap between two finite sets. It is defined as the size of the intersection divided by the smaller of the size of the two sets. The Sorensen-Dice coefficient metric is a statistical metric which measures the similarity between two sets of data. It is defined as twice the number of elements common to both sets divided by the sum of the number of elements in each set. In another example embodiment, to reduce the computational cost of computing similarity score for each audience in the reference audiences 210, an individual can be designated as a representative individual of each audience in the reference audiences 210. The similarity model 230 may then compute the similarity score of each individual in the target audience 225 with the representative individual of each reference audience in the reference audiences 210 using the individual characteristics data. The similarity model 230 may include various techniques and/or algorithms such as item based collaborative filtering or users based collaborative filtering. These techniques are based on the fact that similar individuals tend to show similar patterns of engagement behavior and purchase similar items. Item based filtering uses similarity between the items to determine whether an individual would like it or not, whereas user based finds individuals with similar consumption patterns and identifies the content that these similar individuals found interesting.

The expanded audience 235 is generated based on the similarity scores computed by the similarity model. The expanded audience 235 comprises of individuals belonging to the target audience 225 and the subset of individuals from the set of reference audiences, where the subset of individuals from the reference audiences 210 are selected above a threshold value on the similarity score. The expanded audience 235 increases the size of the target audience 225 and comprises of the individuals from at least one other reference audience in the reference audiences 210 with similar characteristics to the individuals belonging to the target audience. Based on the threshold value selected for each individual in the target audience, one or more similar individuals may be selected as similar belonging to the reference audiences 210 and may comprise of individuals belonging to different type of audience than the target audience 225 type. The expanded audience 235 is then returned to the client device 105b as an output of the audience recommender system 115.

Figure 3:
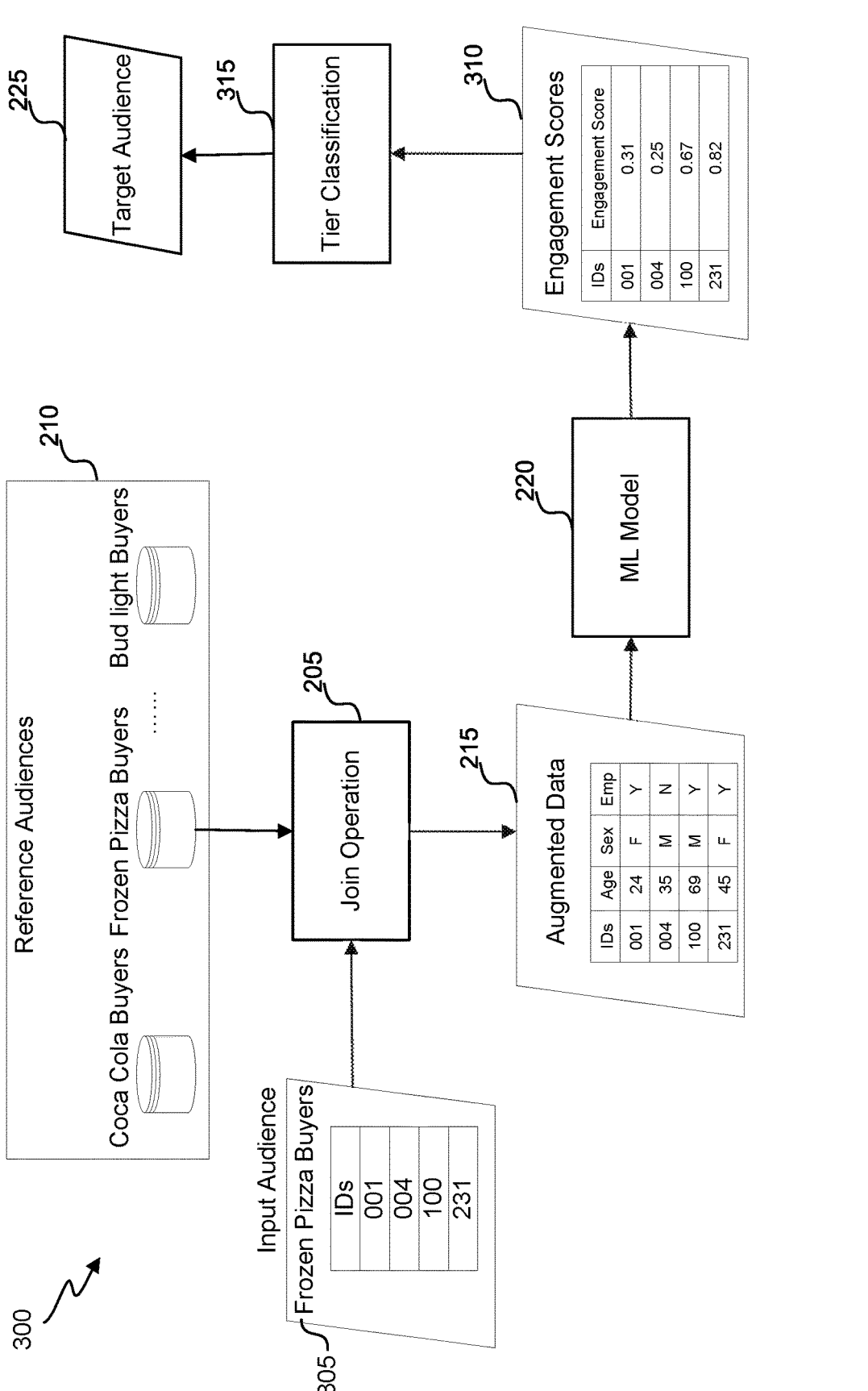
FIG. 3 is an example illustration of target audience generation from an example input audience using join operation with reference audiences followed by ML model to generate engagement scores for each individual in the audience.

FIG. 3 is an example illustration of the target audience 225 generation from an example input audience using the join operation 205 with the reference audiences 210 followed by the ML model 220 to generate engagement scores for every individual in the audience. Example embodiment 300 includes input audience 305, the join operation 205, the reference audiences 210, the augmented data 215, the ML model 220, an engagement scores 310, a tier classification 315 and the target audience 225. The input audience 305 shows an example input audience comprising of individual IDs of Frozen Pizza Buyers. The ID in the input audience refers to the individual ID that uniquely identify the individual. The join operation 205 augments the input data 110 by adding the individual characteristics data from the reference audiences 210 for each matched individual of input audience with the set of individuals in the set of reference audiences. In the example embodiment, the input audience is of type Frozen Pizza, thus the join operation 205 adds in the input data 110 comprising of input audience individual characteristics data of matched individuals from individuals in the input audience with the individuals in the Frozen Pizza Buyer audience in the reference audiences 210. The augmented data 215 comprises of individual IDs belonging to the input audience and augmented individual characteristics data added from the reference audiences 210 for each matched individual of input audience with the set of individuals in the set of reference audiences.

The ML model 220 receives augmented data 215 and uses individual characteristics data of each individual in the reference audiences 210 to train a machine learning model. The machine learning model predicts the engagement scores 310 for each individual as an output where the engagement scores 310 measures the probability of individual's engagement with the targeted content items. The engagement may signify the number of interactions of individuals with the content items (likes, comments, shares, saves etc.) or may measure the number of times the content is displayed to the individual also referred to as impressions or may measure the number of individuals who see the particular content item also referred to as reach. The tier classification 315 uses thresholds on the predicted engagement scores to classify for each individual a tier category from a set of tier categories that includes low, medium or high tier categories with respect to the engagement of individuals with the targeted content items. For example, if the engagement score value is below 0.30 value, it may be classified as low tier category, if the engagement score value is between 0.30 and 0.65, it may be classified as medium tier category and if the engagement score value is above 0.65 it may be classified as high tier category. The thresholds may vary depending upon the type of audience and domain knowledge. The target audience 225 comprises of a subset of individuals belonging to a particular tier category in the set of tier categories. For example, the target audience 225 may comprise of the individuals in the medium or high tier category based on the predicted engagement scores.

Figure 4:
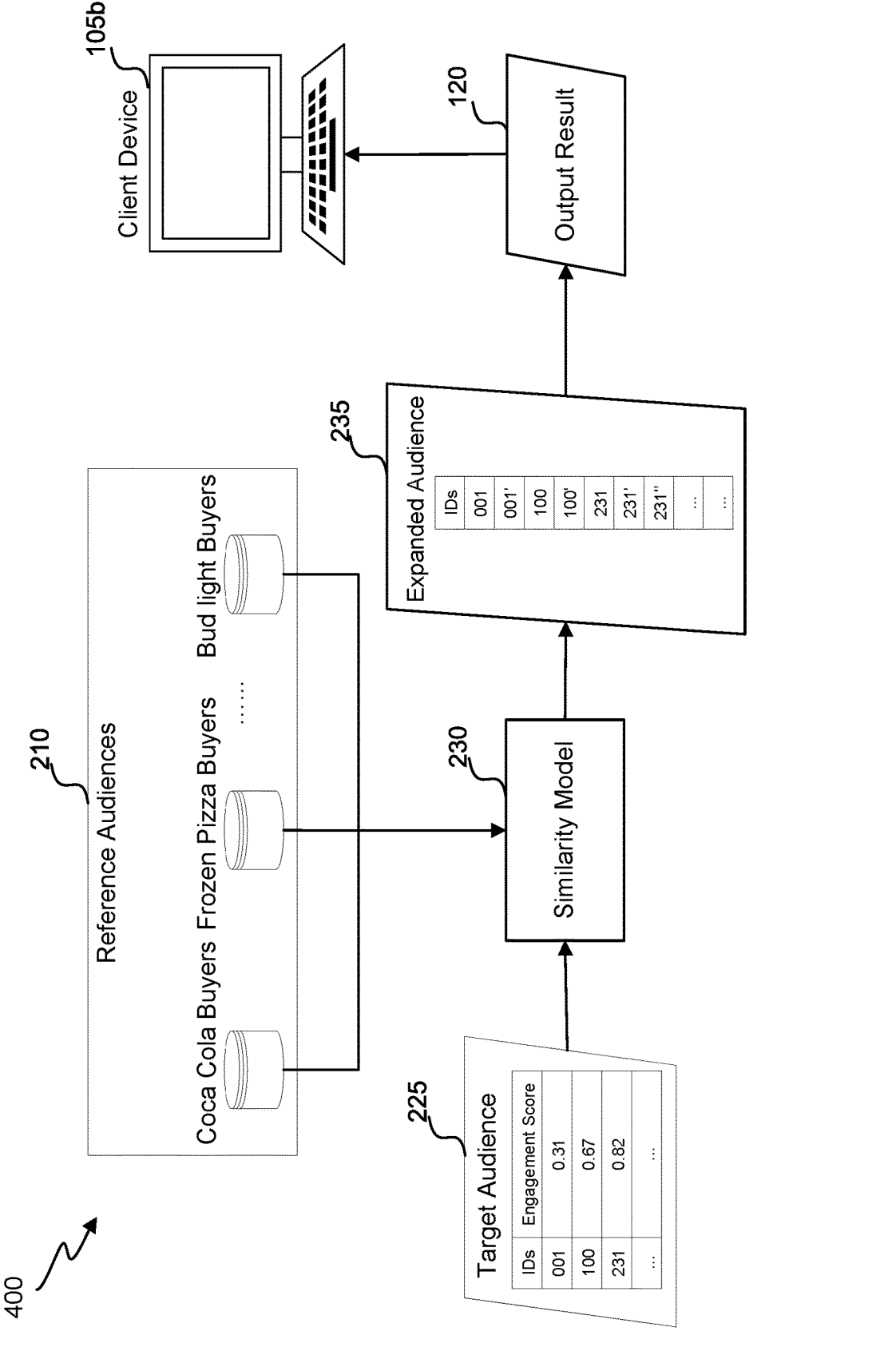
FIG. 4 illustrates the generation of expanded audience from the target audience using similarity model in accordance with some embodiments of the disclosure.

FIG. 4 illustrates the generation of the expanded audience 235 from the target audience 225 using similarity model in accordance with some embodiments of the disclosure. The example embodiment may be implemented by system 400 that includes the target audience 225, the similarity model 230, the reference audiences 210, the expanded audience 235, the output result 120 and the client device 105b. The target audience 225 comprises of individual IDs and their respective engagement scores generated by the ML model 220. The engagement scores 310 signifies the level of individual's engagement with the targeted content items. The target audience 225 comprises of a subset of individuals belonging to a particular tier category in the set of tier categories where tier category can be medium or high tier categories. The target audience 225 may identify what kind of individuals are most likely to be interested in the targeted service or product. Understanding target audiences is crucial to the success of a marketing campaign because consumers will feel as if they connect with the targeted product or service.

The similarity model 230 computes the similarity score for each individual belonging to the target audience 225 with the set of individuals in the reference audiences 210 using individual characteristics data. The similarity model 230 may compute the similarity score of each individual belonging to the target audience 225 with each individual belonging to the audience in the reference audiences 210. To reduce the computational cost, it may compute the similarity score of each individual belonging to the target audience 225 with representative individual of each audience in the reference audiences 210. The expanded audience 235 is generated based on the similarity scores computed by the similarity model. The expanded audience 235 comprises of individuals belonging to the target audience 225 and the subset of individuals from the set of reference audiences, where the subset of individuals from the reference audiences 210 are selected above a threshold value on the similarity score. The expanded audience 235 increases the size of the target audience 225 and comprises of the individuals from at least one other reference audience in the reference audiences 210 with similar characteristics to the individuals belonging to the target audience. Based on the threshold value selected for each individual in the target audience, one or more similar individuals may be selected as similar belonging to the reference audiences 210 and may comprise of individuals belonging to different type of audience than the target audience type. The expanded audience 235 comprises of individual ID 001 belonging to the target audience 225, individual ID 001' is similar to the individual ID 001 based on the individual characteristic data and belongs to the audience in the reference audiences 210. Similarly, for the individual ID 231 belonging to the target audience, two individual IDS 231' and 231" from the audience in the reference audiences 210 that have been identified as similar to the individual ID 231 based on the individual characteristics data. The individuals identified as similar to the individuals in the target audience 225 may belong to the same type of audience as target audience type or may belong to different audience type than the target audience type. The expanded audience 235 is then returned to the client device 105b as the output result 120.

Figure 5:
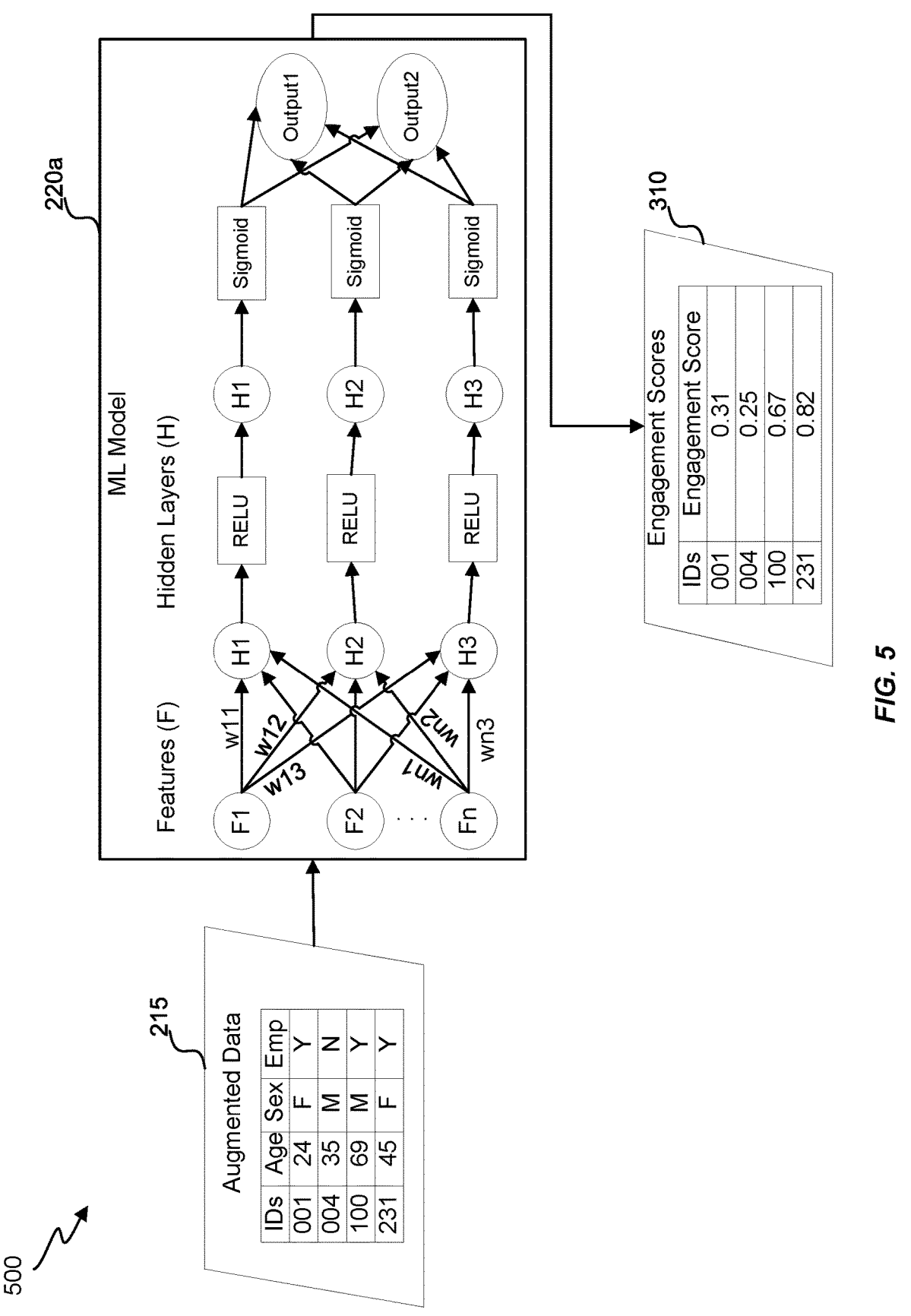
FIG. 5 illustrates the process flow of using audience with augmented data to train an example deep learning model. The model generates engagement scores for every individual in the audience.

FIG. 5 illustrates the process flow 500 of using augmented data by an example deep learning model to generate the engagement scores 310 for every individual in the audience. The example embodiment includes the augmented data 215, an example ML model 220a and the engagement scores 310. The augmented data 215 comprises of individual IDs belonging to the input audience and augmented individual characteristics data added from the reference audiences 210 for each matched individual of input audience with the set of individuals in the reference audiences 210 using the join operation 205. The example ML model 220a receives augmented data 215 where the ML model is trained using individual characteristics data of each individual in the set of reference audiences. The example ML model 220a may use Deep Neural Network to identify patterns and relationships present in the data. The machine learning model during training uses individual characteristics data of the individuals in the reference audiences 210 as input features and receives supervised data with target labels where the target labels signify if the individual was engaged with the targeted content item or not. The engagement of an individual may also include if the individual received impression of the targeted content item or not. Neural networks are layers of nodes, where nodes within individual layers are connected to adjacent layers. The network is said to be deeper based on the number of layers in it. In neural network, signals travel between nodes and assign corresponding weights. A weighted node with higher weight than the weight of other nodes will exert more effect on the next layer of nodes. The final layer compiles the weighted inputs to produce an output. During the training, output received from the neural network is compared with the target labels in the training data. If the output doesn't match, the neural network notes the error and adjusts the weights. In neural networks, the activation function of a node defines the output of that node given an input or set of inputs. The deep neural network may use a rectified linear unit (RELU) which is an activation function that introduces the property of non-linearity to a deep learning model and solves the vanishing gradient issue. The deep neural network may also use a sigmoid function as an activation function in the nodes that maps the input value to a value between 0 and 1. Sigmoid function introduces non-linearity into the mode, allowing the neural network to learn complex decision boundaries. The deep neural network model uses the augmented data 215 as input features and generates the engagement scores 310 of each individual in the augmented data 215 as an output of the deep neural network.

Figure 6:
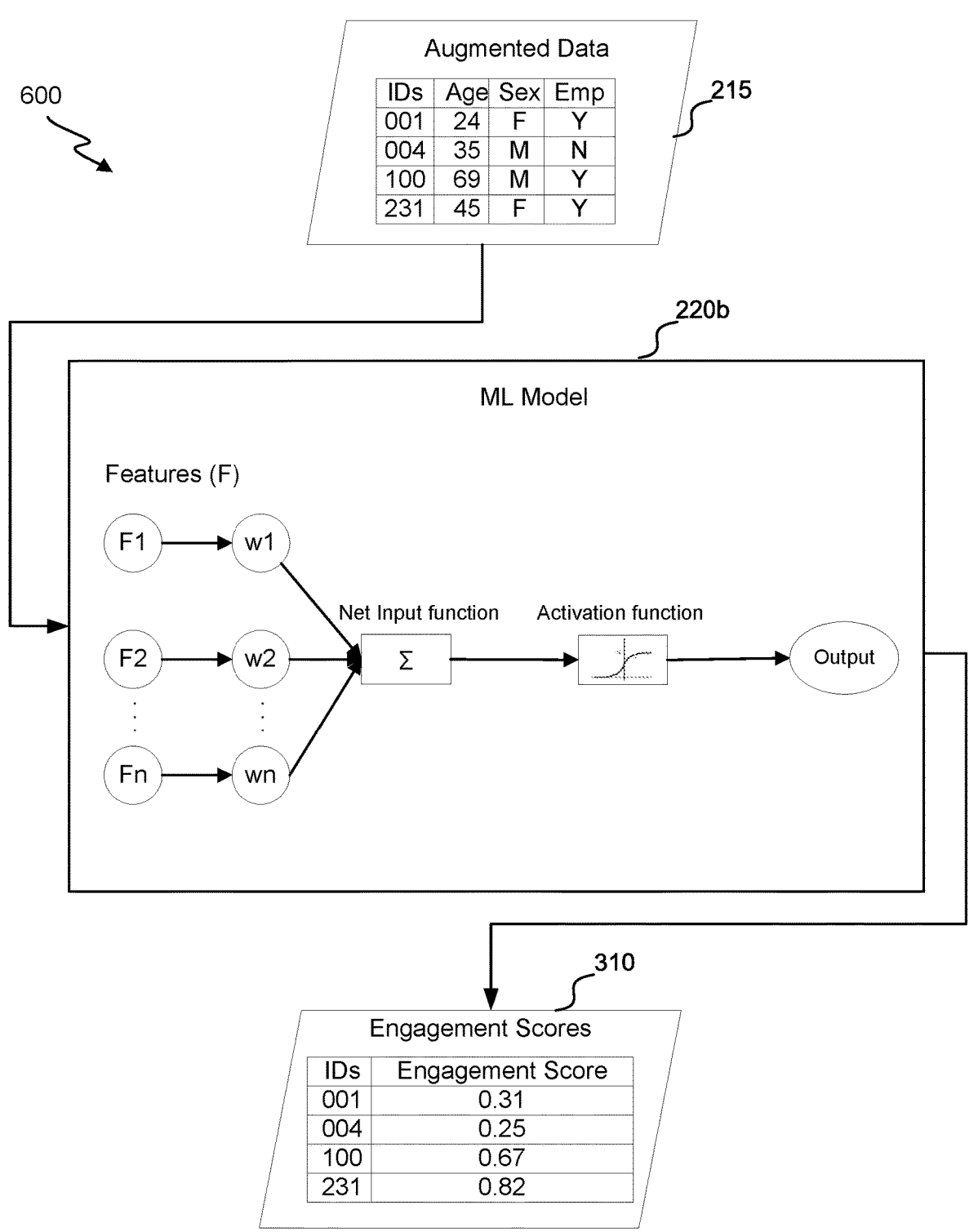
FIG. 6 illustrates another example flow of the present disclosure, where a logistic regression model trained on audience with augmented data can be used to generate engagement scores for every individual.

FIG. 6 illustrates another example flow 600 of the present disclosure, where a trained logistic regression model can be used to generate the engagement scores 310 for every individual using the augmented data 215 as input. The example embodiment includes the augmented data 215, an example ML model 220b and the engagement scores 310. The augmented data 215 comprises of individual IDs belonging to the input audience and augmented individual characteristics data added from the reference audiences 210 for each matched individual of input audience with the set of individuals in the reference audiences 210 using the join operation 205. The example ML model 220b receives the augmented data 215 where the ML model 220 is trained using individual characteristics data of each individual in the set of reference audiences. The example ML model 220b may use Logistic Regression model to find the relationships between individual characteristic data of each individual (treated as independent variables and input features) and engagement of the individual (treated as dependent variable) with the targeted content item. Logistic Regression explores how independent variables affect the dependent variable by looking at historical data values of both variables. Thus, the model uses the learned relationship to predict the engagement scores 310 of the individuals based on the augmented data 215 comprising of individual characteristics data for each individual. The model uses a logistic function as an activation function as the equation between the independent variable x and dependent variable y. The logistic function maps y as a sigmoid function of x. The logistic function returns values between 0 and 1 for the dependent variable, irrespective of the values of the independent variable. The model learns the effect of multiple independent variables on the dependent variable by learning the linear relationship between the different independent variables. The model learns the regression coefficients as weights of each independent variable and computes the sum of the input features multiplied by their corresponding weights and finally calculates the logistic of the result. The model generates the engagement scores 310 of each individual in the augmented data 215 as an output of the logistic regression model where the engagement scores 310 measures the probability of individual's engagement with the targeted content items. The higher the value of the engagement scores 310, the higher the probability that the individual will be engaged with the targeted content items.

Figure 7:
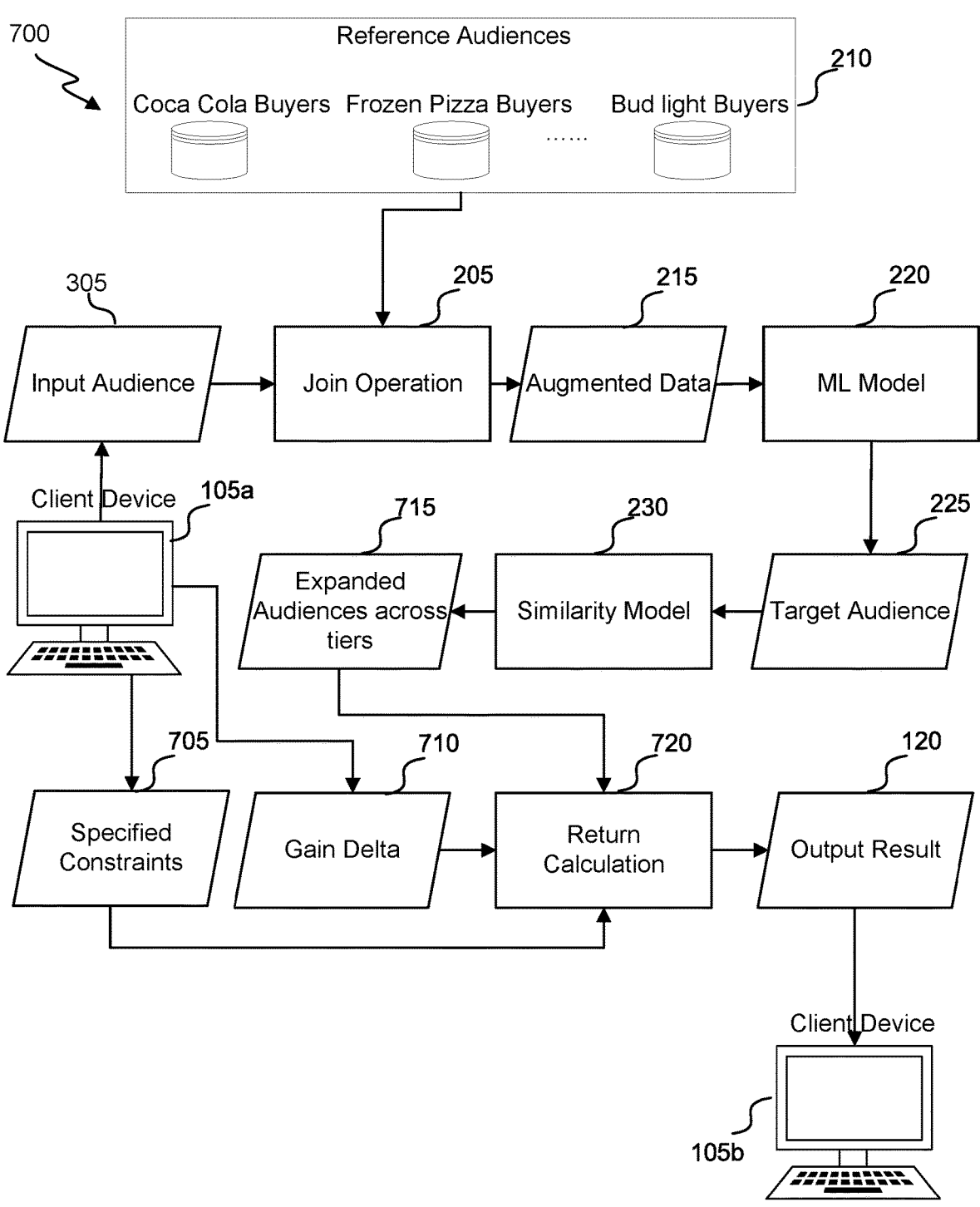
FIG. 7 illustrates the step-by-step process including receiving input audience, specified constraints, and gain delta of changes from a client device, generating augmented data using reference audiences, generating target audience using machine learning model, generating expanded audience using similarity model and calculating return on the targeted contents items.

FIG. 7 illustrates the step-by-step process including receiving input audience, specified constraints, and gain delta of changes from the client device, generating augmented data using reference audiences, generating target audience using machine learning model, generating expanded audience using similarity model and calculating return on the targeted contents items. The input data received from client device 105a comprises of the input audience 305, specified constraints 705 and gain delta 710 of changes on targeted content items. The input audience comprises of individual identifiers (IDs), where individual IDs uniquely identify a specific individual in the audience. The audience is a set of individuals belonging to a type of audience who can be engaged with a particular targeted content item. The specified constraints 705 comprise of receiving a specified indication of a maximum dollar amount to be spent on one or more targeted content items. The gain delta 710 of changes comprises of a difference between gain and expense associated with one or more targeted content items.

Join operation 205 augments the input data by joining the individual IDs in the input audience 305 with the individual IDs in the set of reference audiences 210 stored within the cloud system. The augmented data adds the individual characteristics data from the set of reference audiences for each matched individual IDs belonging to the input audience with the individual IDs belonging to the set of reference audiences. The ML model 220 comprises of the trained machine learning model that uses the augmented data as input and generates engagement score of each individual in the augmented data. The machine learning model is trained using the individual characteristics data of each individual in the set of reference audiences. The machine learning model predicts engagement scores for each individual as an output where engagement score measures the probability of individual's engagement with the targeted content items. Using a threshold on the predicted engagement scores each individual is classified into a tier category from a set of tier categories that includes low, medium or high tier categories with respect to the engagement of individuals with the targeted content items. Based on the classified tier categories, the target audience 225 is generated that comprises of a subset of individuals belonging to a particular tier category in the set of tier categories. For example, the target audience may comprise of the individuals in the medium and/or high tier category based on the predicted engagement scores. The similarity model 230 computes similarity scores of each individual belonging to the target audience 225 with the individuals in the set of reference audiences using individual characteristics data. The similarity score may include a Jaccard similarity metric, an Overlap Coefficient metric or a Sorensen-Dice coefficient metric. The similarity model 230 may include various techniques and/or algorithms such as items based collaborative filtering or users based collaborative filtering. These techniques are based on the fact that similar individuals tend to show similar patterns of engagement behavior and purchase similar items. The similarity model calculates the similarity score of each individual belonging to the target audience across different tier categories.

An expanded audience across tiers 715 is generated based on the similarity scores computed by the similarity model computed for each individual belonging to target audience for each respective tier category. The expanded audience comprises of individuals belonging to the target audience of each tier category and the subset of individuals from the set of reference audiences, where the subset of individuals from the set of reference audiences are selected above a threshold value on the similarity score. The expanded audience increases the size of the target audience and comprises of the individuals from at least one other reference audience in the set of reference audiences with similar characteristics to the individuals belonging to the target audience. Based on the threshold value selected for each individual in the target audience, one or more similar individuals may be selected as similar belonging to the set of reference audiences and may comprise of individuals belonging to different type of audience than the target audience type.

A return calculation 720 receives the expanded audiences across tiers 715, specified constraints 705 and gain delta 710 of changes on the targeted content items. Using an objective function return for expanded audience across each tier category is computed while meeting the specified constraints and gain delta of changes. The return on targeted contents items comprises the revenue earned on one or more targeted content items displayed to the individuals. For example, a content provider may spend one dollar each time a given targeted content item is selected by the individual. If the targeted content item is selected four hundred times, the content provider will spend a total of four hundred dollars on the targeted content item. If every four hundred individual selections results in a purchase of $1200, the content provider's return is the amount the content provider earns on a given purchase ($1200), minus the amount the content provider spent on the content ($400), resulting in a return of $800.

In the example embodiment of the disclosure, return is optimized based on the tiering structure of the audiences while meeting the specified constraints.

$$\max_{x,y} R = \max_{x,y}\left(\frac{E_x - C_y}{C_y}\right) \qquad \text{Equation 1}$$

The return value denoted by R in Equation 1 represents the maximized return value, that is computed for the individuals belonging to an audience, by taking the relative difference between $E_x$ and $C_y$ with respect to $C_y$, where $E_x$ is the expected gain dollars and $C_y$ is the expense in dollars for the targeted content items. The expected gain dollars $E_x$, as defined in Equation 2, is computed by multiplying the individual gain delta denoted by $Gain_{\Delta i}$ for each individual i belonging to the audience by the engagement score of each individual denoted by $RP_i$ and summed over N number of individuals belonging to the audience. The individual gain delta $Gain_{\Delta i}$ is the weighted difference between gain and expense of the targeted content items for each individual and is constrained by the gain delta of changes. The gain delta of changes comprises of a difference between gain and expense associated with one or more targeted content items and is defined in the specified constraints received from the client device.

$$E_x = \sum_{i=1}^{N} Gain_{\Delta i} * RP_i \qquad \text{Equation 2}$$

The expense in dollars $C_y$, as defined in Equation 3 is computed by summing up expense per individual denoted by $CP_i$ for each individual i belonging to the audience where expense per individual measures the expense of engaging the individual with the target content items. $C_y$ is constrained by the maximum dollar amount to be spent on one or more targeted content items in the specified constraints i.e. $C_y \leq$ dollar amount to be spent.

$$C_y = \sum_{i=1}^{N} CP_i \qquad \text{Equation 3}$$

The method iteratively computes the return value for the expanded audience across each tier category. The expanded audience of a specific tier with the highest return value as compared to the return values of the expanded audience with other tiers while meeting the specified constraints, along with the return value are presented to the client device 105b as the output result 120.

Figure 8:
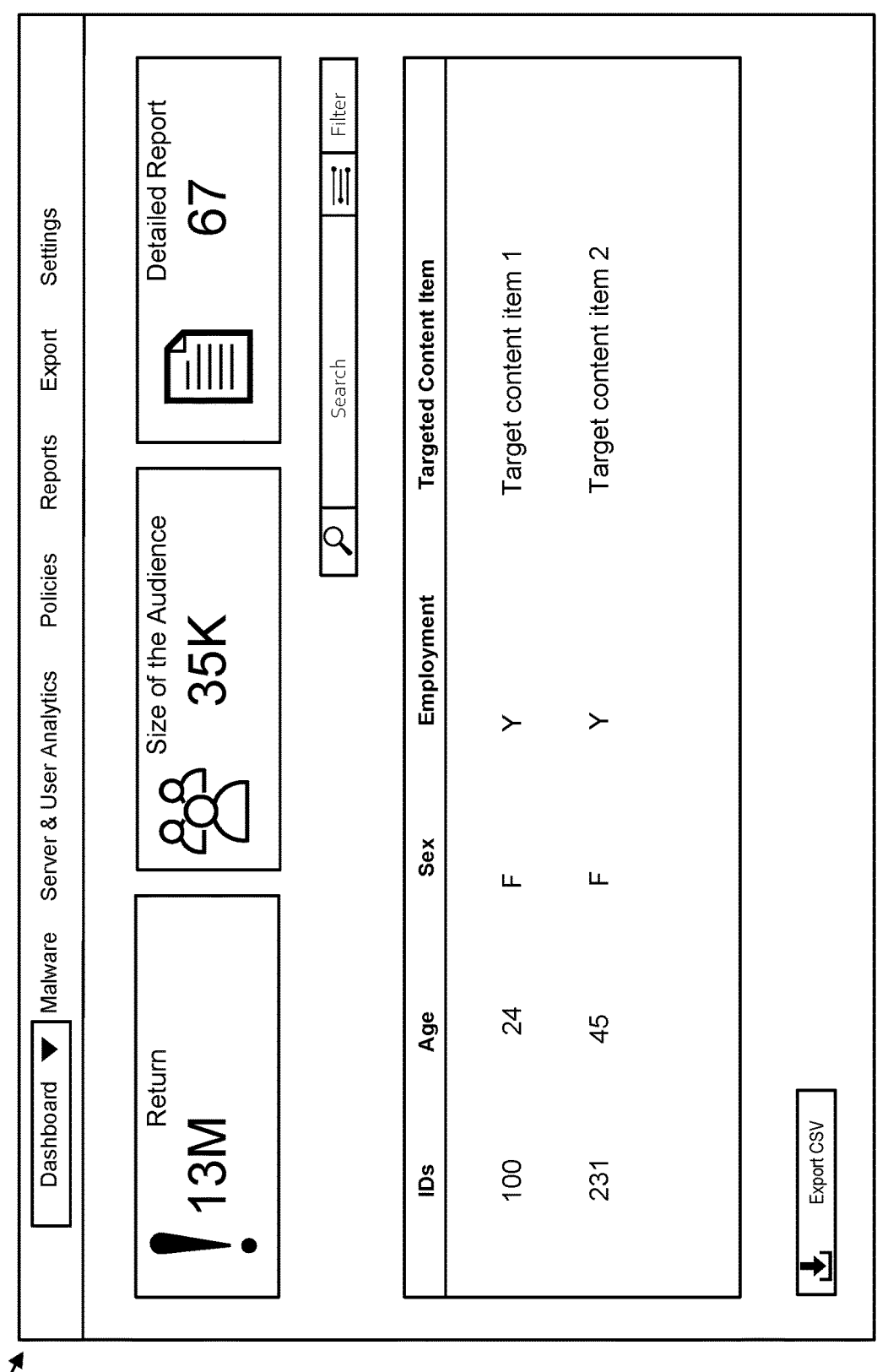
FIG. 8 shows a dashboard for displaying insights of the recommendation, by displaying the return on targeted content item, size of expanded audience, audience characteristics and targeted content items to activate.

FIG. 8 displays a graphical user interface (GUI) that is displayed on the client device 105a or 105b to get insights from the audience recommendation and to learn about the return that can be achieved by activating targeted content items for the recommended audience while meeting the specified constraints and gain delta received as the input data 110 from the client device. A dashboard 800 may display the detailed record of every individual in the recommended audience after the analysis of the data has been effectively performed by using machine learning models and similarity models.

The dashboard 800 may descriptively hold various sections where the audience recommendation information may be displayed elaboratively. The return block displays the return calculated by the audience recommender system 115 while meeting the specified constraints and delta gain of changes received in the input data 110 along with the recommended audience size and detailed report. As the name indicates, the detailed report section shows the descriptive report of the audience including the input audience size and individual IDs belonging to the input audience, the engagement scores 310 of each individual belonging to the input audience, individual IDs belonging to the recommended audience, similarity score of each individual ID belonging to the input audience with the individual IDs added in the recommended audience and the individual characteristics of individuals belonging to the recommended audience. The report may also show in the form of a graphical chart the calculated return across different audiences belonging to different tiers based on the engagement scores 310 of the individuals belonging to the audience while meeting the specified constraints. The panel also displays a table showing the individual characteristic's data, for example demographic information of each individual belonging to the recommended audience. The table may include a column, such as Individual ID, Individual Age, Individual Sex, Individual Employment status and targeted content items to be activated for the individuals. Individual ID displays the unique ID that every individual gets in the initial phase of analysis to maintain confidentiality and the integrity of the data of each individual. The table may also display the percentage increase of the size of recommended audience as compared to the size of the input audience received by the client device.

The advantage of the dashboard 800 is that it displays the detailed insight of the recommended audience and return in the form of tables, graphs and summarized information which may aid in taking timely decision to activate the targeted content items to recommended audience to achieve the desired return while meeting the specified constraints of spend on the targeted content items and gain delta of changes in a reliable, timely and accurate manner.

FIG. 9a illustrates an example process flow 900 of a computer-implemented method 100 according to an example embodiment. At block 905, the input data 110 is received from the client device 105a. Input data 110 may include input audience comprising of individuals belonging to one or more types of audiences. Input data 110 may include text data or numeric data. At block 910, the individual IDs in the input audience collected from the input data 110 are joined with the individual IDs belonging to the reference audiences 210 stored on the cloud system. The reference audiences 210 comprises of one or more types of audiences and may contain individual IDs along with individual characteristics data of each individual belonging to one or more type of audiences. The reference audiences 210 is preprocessed to enhance the quality of the data and ensure data consistency. At block 915, audience with the augmented data 215 is generated where the individual characteristic data is added from the reference audiences 210 stored on the cloud system for each matched individual belonging to the input audience joined with the individual IDs belonging to the set of reference audiences. The augmented data 215 in the input audience adds more features in the input audience and enhances the explainability of the analytical reasoning and process by enhancing the richness of the input data. At block 920, the engagement scores 310 are predicted for every individual belonging to the audience with augmented data 215 using a trained machine learning model. The engagement scores 310 measures the probability of engagement of individuals with the targeted content items. The machine learning model is trained using the individual characteristic data of the individuals belonging to the reference audiences 210 and can include Deep Neural Network model, Support Vector Machine model or Logistic Regression model etc. The model predicts the engagement scores 310 by identifying various patterns and studying the relationships among the individual characteristics of the individuals. At block 925, using a threshold on the engagement scores 310, each individual IDs in the audience with the augmented data 215 is classified into a tier category which signifies the level of engagement of individuals with the targeted content items. The target audience 225 is then generated by taking a subset of individuals from the individuals belonging to one or more tier categories. At block 930, the expanded audience 235 is generated by using the similarity model 230 that computes the similarity scores for every individual belonging to the target audience 225 with the individuals belonging to the reference audiences 210. The expanded audience 235 increases the size of the target audience 225 by identifying individuals from at least one other reference audience, in the set of reference audiences, with similar characteristics to the individuals belonging to the target audience. At block 940, the result is generated comprising of the expanded audience 235 and it is output on the dashboard 800.

Figure 9B:
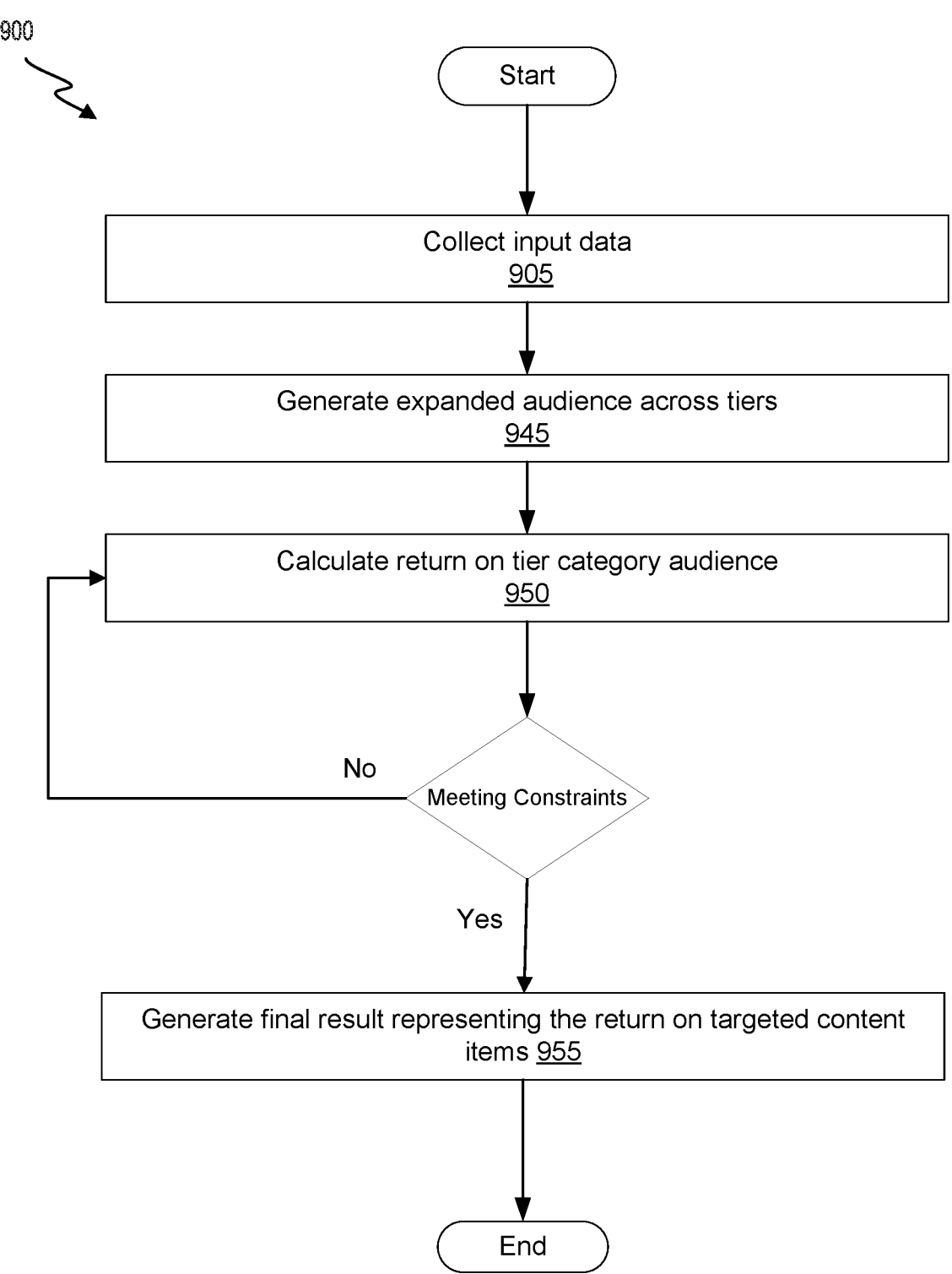

FIG. 9*b* illustrates an example flow of a method for obtaining final output result of return on targeted content items according to an example embodiment. At block 905, the input data 110 is received from the client device 105*a*. Input data 110 may include input audience comprising of individuals belonging to one or more types of audiences, specified constraints or gain delta of changes on the targeted content items. Specified constraints may include the indication of a maximum dollar amount to be spent on one or more content items and gain delta of changes includes constraints on difference between the expense and gain on the targeted content items. At block 945, based on the similarity scores computed by the similarity model for each individual in the target audience, the expanded audience across tiers 715 is generated. The expanded audience increases the size of the target audience and comprises of individuals of different tier categories. At block 950, return is calculated for the expanded audience across tiers 715 based on the specified constraints and delta gain of changes in the input data 110 received from the client device. The method iteratively computes the return value, which meets the specified constraints, for the expanded audience comprising of individuals across each tier category. At block 955, the expanded audience of a specific tier with the highest return value as compared to the return values of the expanded audience with other tiers while meeting the specified constraints along with its return value are presented to the client device as the output result 120.

Figure 10:
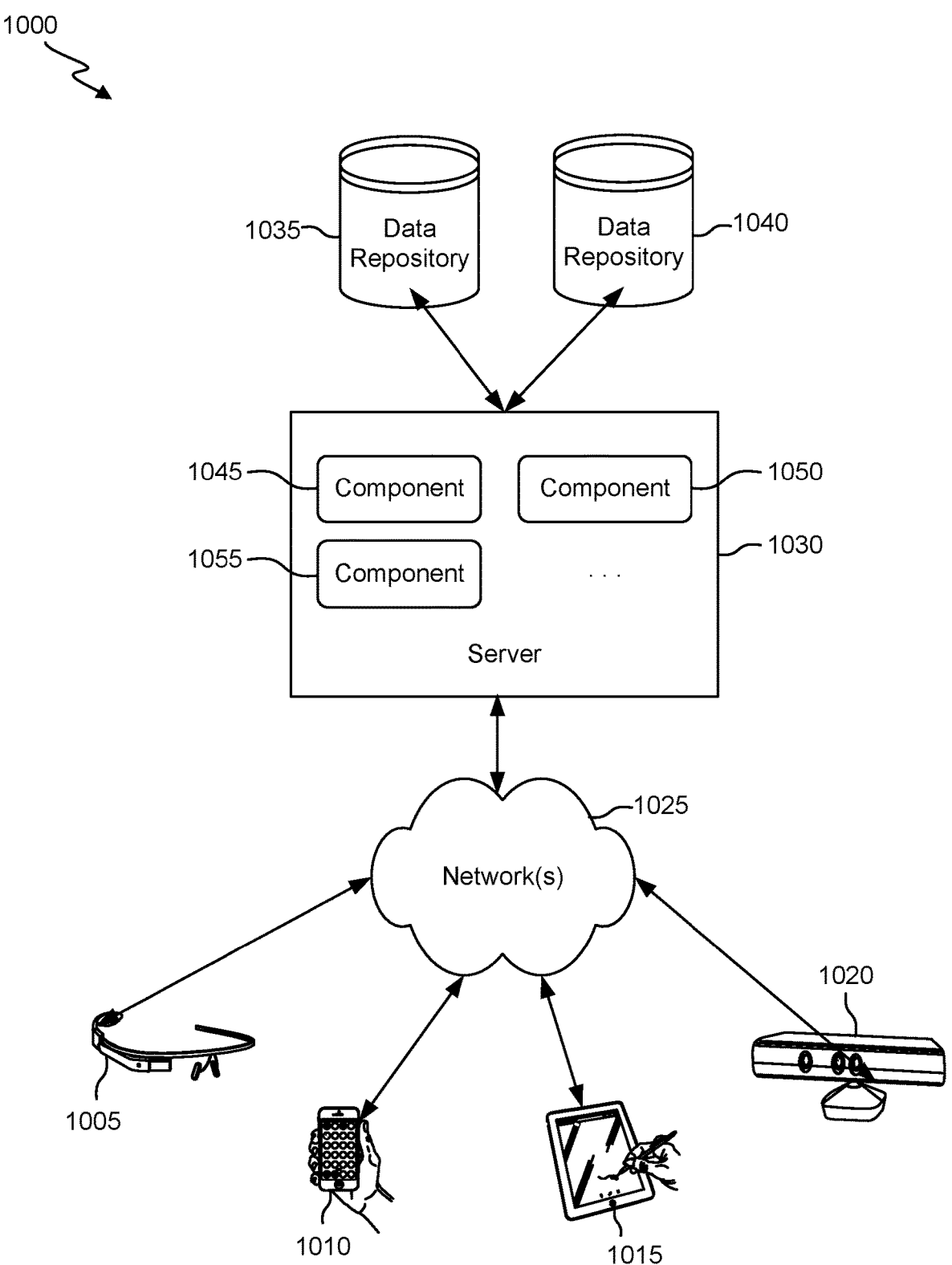
FIG. 10 illustrates a simplified diagram of a distributed system for implementing the method of FIG. 1.

FIG. 10 depicts a simplified diagram of a distributed system 1000 for implementing computer-implemented method 100 of FIG. 1. In the illustrated embodiment, the distributed system 1000 includes one or more subject computing devices 1005, 1010, 1015, and 1020, coupled to a server 1030 via one or more network(s) 1025. The subject computing devices 1005, 1010, 1015, and 1020 may be configured to execute one or more applications.

In various aspects, the server 1030 may be adapted to run one or more services or software applications that enable techniques for audience and return recommendation using machine learning and similarity model 230 based on the individual characteristic data of individuals in the audience. In certain aspects, the server 1030 may also provide other services or software applications that can include non-virtual and virtual environments. In some respects, these services may be offered as web-based or cloud services, such as under a Software as a Service (SaaS) model to the users of the subject computing devices 1005, 1010, 1015, and/or 1020. Users operating the subject computing devices 1005, 1010, 1015, and/or 1020 may in turn utilize one or more subject applications to interact with the server 1030 to utilize the services provided by these components. Furthermore, the subject computing devices 1005, 1010, 1015, and/or 1020 may in turn utilize one or more subject applications for audience and return recommendation.

In the configuration depicted in FIG. 10, the server 1030 may include one or more components 1045, 1050 and 1055 that implement the functions performed by the server 1030. These components may include software components that may be executed by one or more processors, hardware components, or combinations thereof. It should be appreciated that various system configurations are possible, which may be different from the distributed system 1000. The embodiment shown in FIG. 10 is thus one example of the distributed system 1000 for implementing an embodiment system and is not intended to be limiting.

Users may use the subject computing devices 1005, 1010, 1015, and/or 1020 for audience and return recommendation using machine learning model and the similarity model 230 based on the individual characteristic data of individuals in the audience in accordance with the teachings of this disclosure. A subject device may provide an interface that enables a user of the subject device to interact with the subject device. The subject device may also output information to the user via this interface. Although FIG. 10 depicts only four subject computing devices, any number of subject computing devices may be supported.

The subject devices may include various types of computing systems such as portable handheld devices, general purpose computers such as personal computers and laptops, workstation computers, wearable devices, gaming systems, thin subjects, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Apple Vision Pro®, Ray-Ban© Meta Smart Glasses®, Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1025 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1025 can be a Local Area Network (LAN), network based on Ethernet, Token-Ring, a Wide-Area Network (WAN), the Internet, a virtual network, a Virtual Private Network (VPN), an intranet, an extranet, a Public Switched Telephone Network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1030 may include one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1030 can include one or more virtual machines running virtual operating systems, or other computing architectures involving virtualization such as one or more flexible pools of logical storage devices that can be virtualized to maintain virtual storage devices for the server. In various aspects, server 1030 may be adapted to run one or more services or software applications that provide the functionality described in the foregoing disclosure.

The computing systems in server 1030 may run one or more operating systems including any of those discussed above, as well as any commercially available server operating system. Server 1030 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1030 may include one or more applications to implement various machine-learning algorithms. The data in the input data 110 of FIG. 1 may include input audience comprising of individual IDs belonging to a specific type of audience. As an example, in case where the data samples are text or image that may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1030 may also include one or more applications to display the output of various processes of computer-implemented method 100 via one or more display devices of the subject computing devices 1005, 1010, 1015, and 1020.

Distributed system 1000 may also include one or more data repositories 1035, 1040. These data repositories 1035, 1040 may be used to store data in database 105 and other information in certain aspects. Data repositories 1035, 1040 may reside in a variety of locations. For example, a data repository used by the server 1030 may be local to the server 1030 or may be remote from the server 1030 and in communication with the server 1030 via a network-based or dedicated connection. The data repositories 1035, 1040 may be of different types. In certain aspects, a data repository used by the server 1030 may be a database, for example, a relational database, such as databases provided by Oracle Corporation® and other vendors. One or more of these databases may be adapted to enable storage, update, and retrieval of data to and from the database in response to structured query language (SQL)-formatted commands.

In certain aspects, the data repositories 1035, 1040 may also be used by applications to store application data. The data repositories 1035, 1040 used by applications may be of different types such as, for example, a key-value store repository, an object store repository, or a general storage repository supported by a file system.

In certain aspects, the techniques for audience and return recommendation using machine learning and the similarity model 230 based on the individual characteristic data of individuals in the audience described in this disclosure may be offered as services via a cloud environment. FIG. 10 is a simplified block diagram of a cloud-based system environment in which various services of the server 1030 of FIG. 10 may be offered as cloud services, in accordance with certain aspects. In the embodiment depicted in FIG. 10, the subject computing devices 1005 may provide one or more cloud services that may be requested by users using one or more subject computing devices 1010, 1015, and 1020. The subject computing devices 1005, 1010, 1015, and 1020 may comprise one or more computers and/or servers that may include those described for the server 1030. The computers in the subject computing devices 1005, 1010, 1015, and 1020 may be organized as general-purpose computers, specialized server computers, server farms, server clusters, or any other appropriate arrangement and/or combination.

Network(s) 1025 may facilitate communication and exchange of data between the subject computing devices 1010, 1015, and 1020 and the subject computing devices 1005. The network(s) 1025 may include one or more networks. The networks 1025 may be of the same or different types. Network(s) 1025 may support one or more communication protocols, including wired and/or wireless protocols, for facilitating communications.

Figure 11:
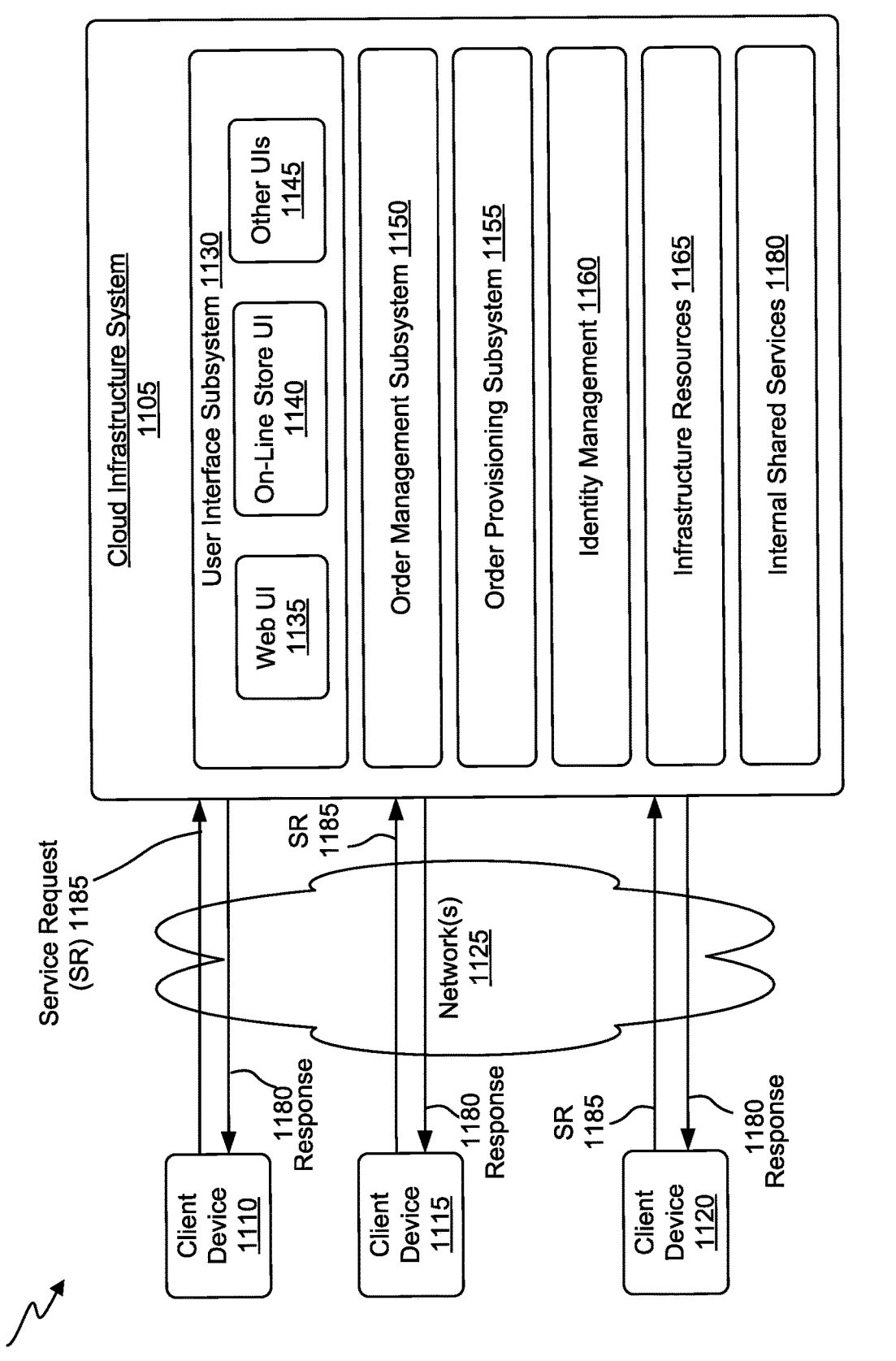
FIG. 11 illustrates a simplified block diagram of a cloud-based system environment in which various services of server may be offered as cloud services.

The embodiment depicted in FIG. 11 is only one example of a cloud infrastructure system 1105 and is not intended to be limiting. It should be appreciated that, in some other respects, the cloud infrastructure system 1105 may have more or fewer components than those depicted in FIG. 11, may combine two or more components, or may have a different configuration or arrangement of components. For example, although FIG. 11 depicts three subject computing devices, any number of subject computing devices may be supported in alternative aspects.

The term cloud service is generally used to refer to a service that is made available to users on demand and via a communication network such as the Internet by systems (e.g., the cloud infrastructure system 1105) of a service provider. Typically, in a public cloud environment, servers and systems that make up the cloud service provider's system are different from the subject's own on-premises servers and systems. The cloud service provider's systems are managed by the cloud service provider. Subjects can thus avail themselves of cloud services provided by a cloud service provider without having to purchase separate licenses, support, or hardware and software resources for the services. For example, a cloud service provider's system may host an application, and a user may, via a network 1125 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, the cloud infrastructure system 1105 may provide one or more cloud services using different models such as under a Software as a Service (SaaS) model, a Platform as a Service (PaaS) model, an Infrastructure as a Service (IaaS) model, and others, including hybrid service models. The cloud infrastructure system 1105 may include a suite of applications, middleware, databases, and other resources that enable provision of the various cloud services.

A SaaS model enables an application or software to be delivered to a subject over a communication network like the Internet, as a service, without the subject having to buy the hardware or software for the underlying application. For example, a SaaS model may be used to provide subjects access to on-demand applications that are hosted by the cloud infrastructure system 1105. Examples of SaaS services provided by Oracle Corporation® include, without limitation, various services for human resources/capital management, subject relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a subject as a cloud service to provide elastic compute and storage capabilities. Various IaaS services are provided by Oracle Corporation®.

A PaaS model is generally used to provide, as a service, platform and environment resources that enable subjects to develop, run, and manage applications and services without the subject having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a subject, via a subscription order, may order one or more services provided by the cloud infrastructure system 1105. The cloud infrastructure system 1105 then performs processing to provide the services requested in the subject's subscription order. Cloud infrastructure system 1105 may be configured to provide one or even multiple cloud services.

Cloud infrastructure system 1105 may provide cloud services via different deployment models. In a public cloud model, the cloud infrastructure system 1105 may be owned by a third-party cloud services provider and the cloud services are offered to any general public subject, where the subject can be an individual or an enterprise. In certain other aspects, under a private cloud model, the cloud infrastructure system 1105 may be operated within an organization (e.g., within an enterprise organization) and services provided to subjects that are within the organization. For example, the subjects may be various departments of an enterprise such as the Human Resources department, the payroll department, etc. or even individuals within the enterprise. In certain other aspects, under a community cloud model, the cloud infrastructure system 1105 and the services provided may be shared by several organizations in a related community. Various other models such as hybrids of the above-mentioned models may also be used.

The client devices 1110, 1115, and 1120 may be of several types (such as the cloud infrastructure system 1105, 1110, 1115, and 1120 depicted in FIG. 11) and may be capable of operating one or more subject applications. A user may use a subject device to interact with the cloud infrastructure system 1105, such as to request a service provided by the cloud infrastructure system 1105. 105*a*, 105*b*, 1110, 1115, and 1120 may be the same client devices or may comprise of different client devices comprising of one or more computer systems.

As depicted in the embodiment in FIG. 11, the cloud infrastructure system 1105 may include infrastructure resources 1175 that can be utilized for facilitating the provision of various cloud services offered by the cloud infrastructure system 1105. These services include 905, 910, 915, 920, 925, 930, 935, 940, 945, 950, 955 as shown in FIG. 9*a* and FIG. 9*b*. Infrastructure resources 1175 may include, for example, processing resources, storage or memory resources, networking resources, and the like.

In certain aspects, to facilitate efficient provisioning of these resources for supporting the various cloud services provided by the cloud infrastructure system 1105 for different subjects, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1105 may itself internally use services 1170 that are shared by different components of the cloud infrastructure system 1105 and which facilitate the provisioning of services by the cloud infrastructure system 1105. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1105 may comprise multiple subsystems. These subsystems may be implemented in software, or hardware, or combinations thereof. As depicted in FIG. 11, the subsystems may include a user interface subsystem 1130 that enables users or subjects of cloud infrastructure system 1105 to interact with cloud infrastructure system 1105. User interface subsystem 1130 may include various interfaces such as a web interface 1135, an online store interface 1140 where cloud services provided by the cloud infrastructure system 1105 are advertised and are purchasable by a consumer, and other interfaces 1145. For example, a subject may, using a subject device, request (service request 1175) one or more services provided by the cloud infrastructure system 1105 using one or more of interfaces 1135, 1140, and 1145. For example, a subject may access the online store, browse cloud services offered by the cloud infrastructure system 1105, and place a subscription order for one or more services offered by the cloud infrastructure system 1105 that the subject wishes to subscribe to. The service request may include information identifying the subject and one or more services that the subject desires to subscribe to. For example, a subject may place a subscription order for a Chabot related service offered by cloud infrastructure system 1105. As part of the order, the subject may provide information identifying for input (e.g., utterances).

In certain aspects, such as the embodiment depicted in FIG. 11, cloud infrastructure system 1105 may comprise an order management subsystem (OMS) 1150 that is configured to process the new order. As part of this processing, OMS 1150 may be configured to: create an account for the subject, if not done already; receive billing and/or accounting information from the subject that is to be used for billing the subject for providing the requested service to the subject; verify the subject information; upon verification, book the order for the subject; and orchestrate various workflows to prepare the order for provisioning.

Once properly validated, OMS 1150 may then invoke Order Provisioning Subsystem (OPS) 1155 that is configured to provision resources for the order including processing, memory, and networking resources. The provisioning may include allocating resources for the order and configuring the resources to facilitate the service requested by the subject order. The manner in which resources are provisioned for an order and the type of the provisioned resources may depend upon the type of cloud service that has been ordered by the subject. For example, according to one workflow, OPS 1155 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting subject for providing the requested service.

Cloud infrastructure system 1105 may send a response or notification 1190 to the requesting subject to indicate when the requested service is now ready for use. In some instances, information (e.g., a link) may be sent to the subject that enables the subject to start using and availing the benefits of the requested services.

Cloud infrastructure system 1105 may provide services to multiple subjects. For each subject, cloud infrastructure system 1105 is responsible for managing information related to one or more subscription orders received from the subject, maintaining subject data related to the orders, and providing the requested services to the subject. Cloud infrastructure system 1105 may also collect usage statistics regarding a subject's use of subscribed services. For example, statistics may be collected for the amount of storage used, the amount of data transferred, the number of users, and the amount of system up time and system down time, and the like. This usage information may be used to bill the subject. Billing may be done, for example, on a monthly cycle.

Cloud infrastructure system 1105 may provide services to multiple subjects in parallel. Cloud infrastructure system 1105 may store information for these subjects, including possibly proprietary information. In certain aspects, cloud infrastructure system 1105 comprises an identity management subsystem (IMS) 1170 that is configured to manage subject's information and provide the separation of the managed information such that information related to one subject is not accessible by another subject. IMS 1170 may be configured to provide various security-related services such as identity services, such as information access management, authentication and authorization services, services for managing subject identities and roles and related capabilities, and the like.

Figure 12:
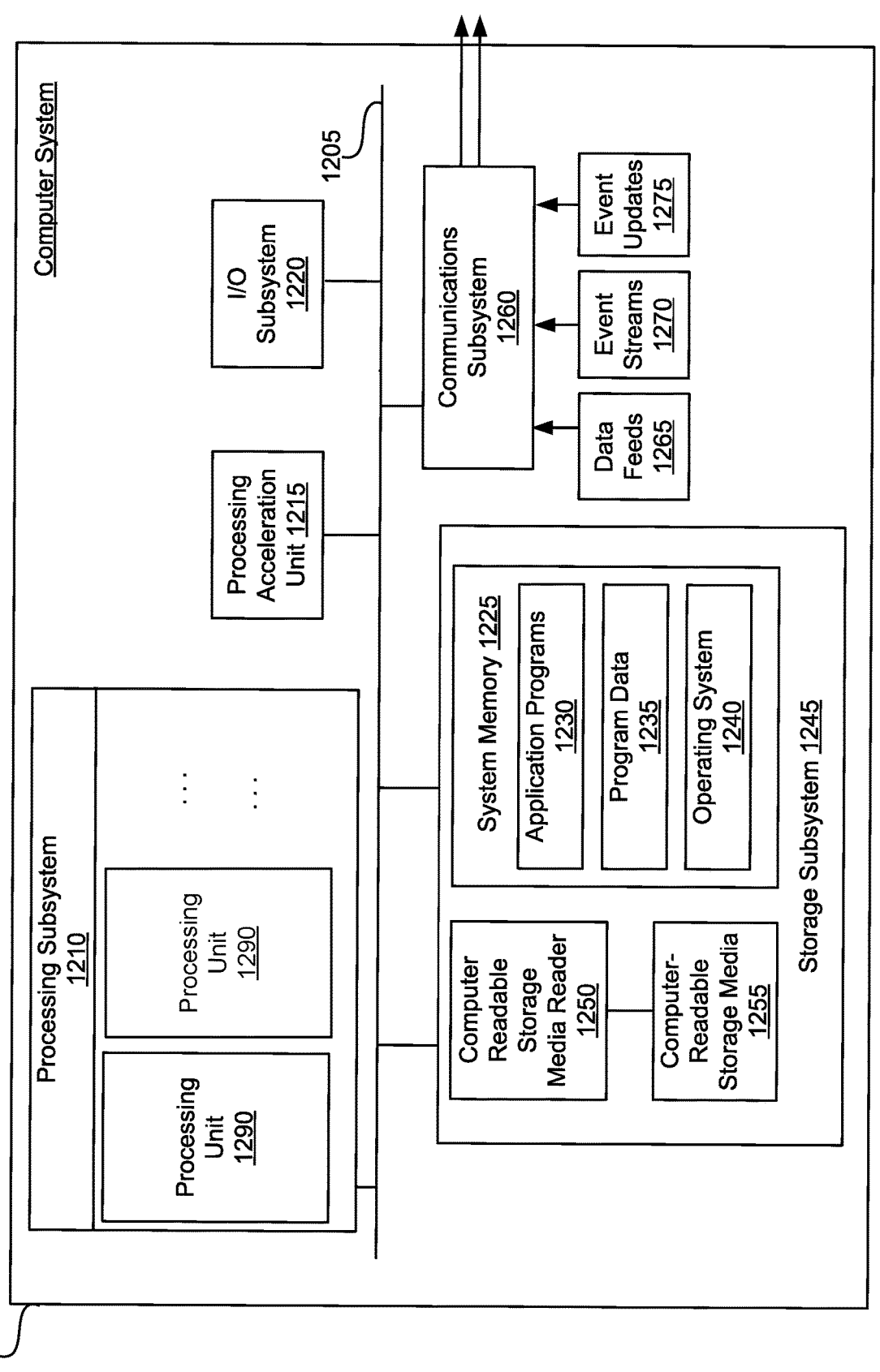
FIG. 12 illustrates an example architecture of a computing system that can implement at least one example of the disclosed method.

FIG. 12 illustrates an exemplary computer system 1200 that may be used to implement certain aspects of the audience recommendation system. For example, in some aspects, computer system 1200 may be used to implement any of the systems for audience and return recommendation using machine learning and the similarity model 230 based on the individual characteristic data of individuals in the audience shown in FIG. 1 and various servers and computer systems described above. As shown in FIG. 12, computer system 1200 includes various subsystems including a processing subsystem 1210 that communicates with a few other subsystems via a bus subsystem 1205. These other subsystems may include a processing acceleration unit 1215, and I/O subsystem 1220, a storage subsystem 1245, and a communications subsystem 1270. Storage subsystem 1245 may include non-transitory computer-readable storage media including storage media 1255 and a system memory 1225.

Bus subsystem 1205 provides a mechanism for letting the various components and subsystems of computer system 1200 communicate with each other as intended. Although bus subsystem 1205 is shown schematically as a single bus, alternative aspects of the bus subsystem may utilize multiple buses. Bus subsystem 1205 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P13127.1 standard, and the like.

Processing subsystem 1210 controls the operation of computer system 1200 and may comprise one or more processors, application specific integrated circuits (ASICs), or field programmable gate arrays (FPGAs). The processors may include single core or multicore processors. The processing resources of computer system 1200 can be organized into one or more processing units 1290, 1280, etc. A processing unit may include one or more processors, one or more cores from the same or different processors, a combination of cores and processors, or other combinations of cores and processors. In some embodiments, processing subsystem 1210 can include one or more special purpose co-processors such as graphics processors, digital signal processors (DSPs), or the like. In some embodiments, some or all of the processing units of processing subsystem 1210 can be implemented using customized circuits, such as application specific integrated circuits (ASICs), or field programmable gate arrays (FPGAs).

In some embodiments, the processing units in processing subsystem 1210 can execute instructions stored in system memory 1225 or on computer readable storage media 1255. In various aspects, the processing units can execute a variety of programs or code instructions and can maintain multiple concurrently executing programs or processes. At any given time, some, or all of the program code to be executed can be resident in system memory 1225 and/or on computer-readable storage media 1255 including potentially on one or more storage devices. Through suitable programming, processing subsystem 1210 can provide various functionalities described above. In instances where computer system 1200 is executing one or more virtual machines, one or more processing units may be allocated to each virtual machine.

In certain aspects, a processing acceleration unit 1215 may optionally be provided for performing customized processing or for off-loading some of the processing performed by processing subsystem 1210 to accelerate the overall processing performed by computer system 1200.

I/O subsystem 1220 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 370 game controller, devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device (e.g., Apple Vision Pro®, Ray-Ban© Meta Smart Glasses®, Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a Cathode Ray Tube (CRT), a flat-panel device, such as that using a Liquid Crystal Display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 1245 provides a repository or data store for storing information and data that is used by computer system 1200. Storage subsystem 1245 provides a tangible non-transitory computer-readable storage medium for storing the basic programming and data constructs that provide the functionality of some aspects. Storage subsystem 1245 may store software (e.g., programs, code modules, instructions) that when executed by processing subsystem 1210 provides the functionality described above. The software may be executed by one or more processing units of processing subsystem 1210. Storage subsystem 1245 may also provide a repository for storing data used in accordance with the teachings of this disclosure.

Storage subsystem 1245 may include one or more non-transitory memory devices, including volatile and non-volatile memory devices. As shown in FIG. 12, storage subsystem 1245 includes a system memory 1225 and a computer-readable storage media 1255. System memory 1225 may include a number of memories including a volatile main random-access memory (RAM) for storage of instructions and data during program execution and a non-volatile Read Only Memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1210. In some implementations, system memory 1225 may include multiple different types of memory, such as Static Random Access Memory (SRAM), Dynamic Random Access Memory (DRAM), and the like.

By way of example, and not limitation, as depicted in FIG. 12, system memory 1225 may load application programs 1230 that are being executed, which may include various applications such as Web browsers, mid-tier applications, relational database management systems (RDBMS), etc., program data 1235, and an operating system 1240. By way of example, operating system 1240 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1255 may store programming and data constructs that provide the functionality of some aspects. Computer-readable media 1255 may provide storage of computer-readable instructions, data structures, program modules, and other data for computer system 1200. Software (programs, code modules, instructions) that, when executed by processing subsystem 1210 provides the functionality described above, may be stored in storage subsystem 1245. By way of example, computer-readable storage media 1255 may include non-volatile memory such as a hard disk drive, a magnetic disk drive, an optical disk drive such as a CD ROM, digital video disc (DVD), a Blu-Ray® disk, or other optical media. Computer-readable storage media 1255 may include, but is not limited to, Zip® drives, flash memory cards, universal serial bus (USB) flash drives, secure digital (SD) cards, DVD disks, digital video tape, and the like. Computer-readable storage media 1255 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magneto resistive RAM (MRAM) SSDs, and hybrid SSDs that use a combination of DRAM and flash memory based SSDs.

In certain aspects, storage subsystem 1245 may also include a computer-readable storage media reader 1250 that can further be connected to computer-readable storage media 1255. Reader 1250 may receive and be configured to read data from a memory device such as a disk, a flash drive, etc.

In certain aspects, computer system 1200 may support virtualization technologies, including but not limited to virtualization of processing and memory resources. For example, computer system 1200 may provide support for executing one or more virtual machines. In certain aspects, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1270 provides an interface to other computer systems and networks. Communications subsystem 1270 serves as an interface for receiving data from and transmitting data to other systems from computer system 1200. For example, communications subsystem 1270 may enable computer system 1200 to establish a communication channel to one or more subject devices via the Internet for receiving and sending information from and to the subject devices. For example, the communication subsystem may be used to transmit a response to a user regarding the inquiry for a Chabot.

Communication subsystem 1270 may support both wired and/or wireless communication protocols. For example, in certain aspects, communications subsystem 1270 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 1202.XX family standards, or other mobile communication technologies, or any combination thereof), global positioning system (GPS) receiver components, and/or other components. In some aspects communications subsystem 1270 can provide wired network connectivity (e.g., Ethernet) in addition to or instead of a wireless interface.

Communication subsystem 1270 can receive and transmit data in various forms. For example, in some embodiments, in addition to other forms, communications subsystem 1270 may receive input communications in the form of structured and/or unstructured data feeds 1275, event streams 1270, event updates 1275, and the like. For example, communications subsystem 1270 may be configured to receive (or send) data feeds 1275 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1270 may be configured to receive data in the form of continuous data streams, which may include event streams 1270 of real-time events and/or event updates 1275, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1270 may also be configured to communicate data from computer system 1200 to other computer systems or networks. The data may be communicated in various forms such as structured and/or unstructured data feeds 1275, event streams 1270, event updates 1275, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a personal digital assistant (PDA)), a wearable device (e.g., a Apple Vision Pro®, Ray-Ban® Meta Smart Glasses®, Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in art can appreciate other ways and/or methods to implement the various aspects.

Figure 13:
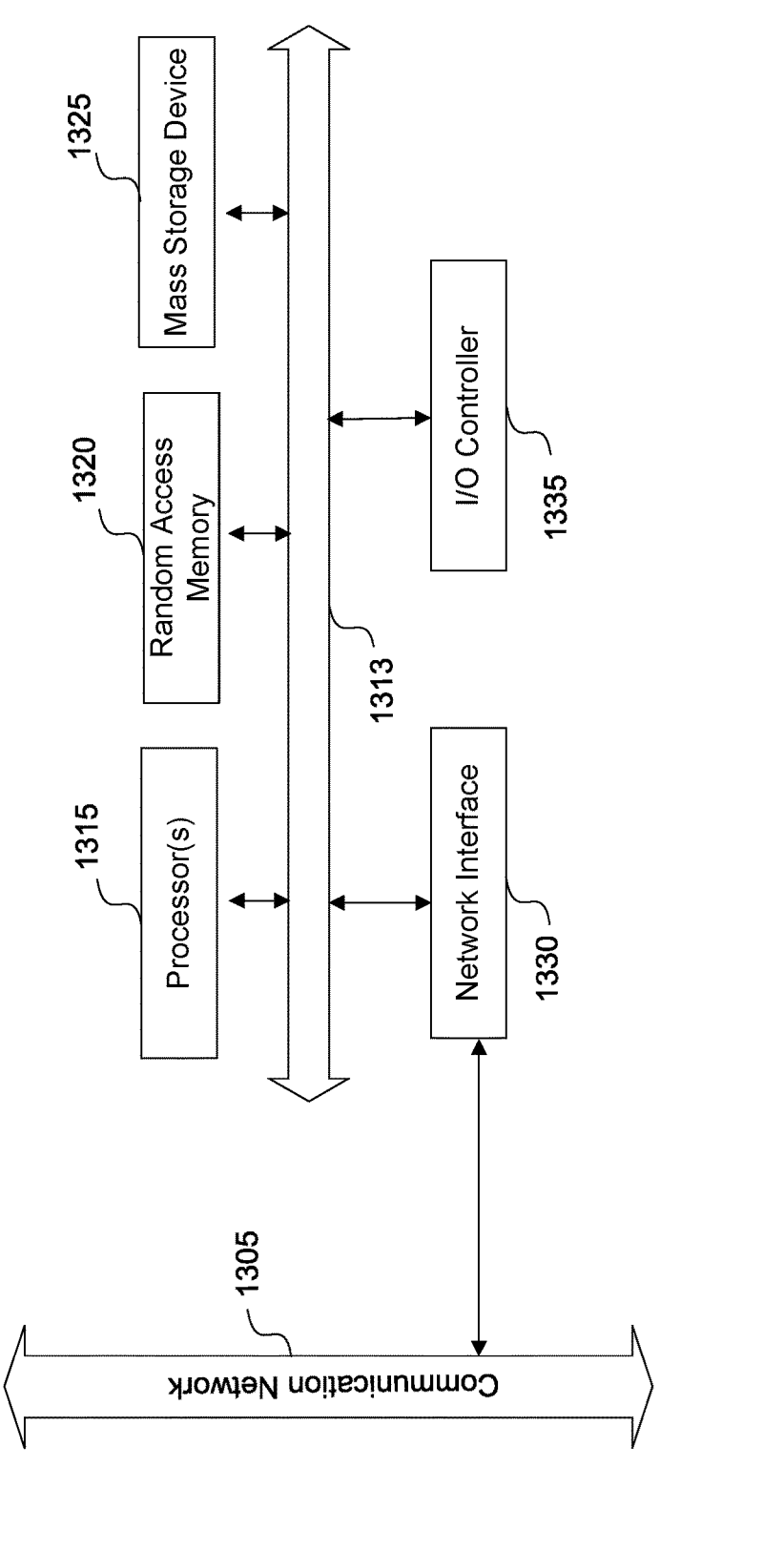
FIG. 13 illustrates an exemplary server which may include a processor, a memory, and a mass storage device.

FIG. 13 illustrates an exemplary server which may include a processor, a memory, and a mass storage device. An exemplary Server 1300 may include a processor 1315, a memory (e.g., RAM) 1320, a bus 1310 which couples processor 1315 and the memory 1320, a mass storage device 1325 (e.g., a magnetic or optical disk) coupled to the processor 1315 and the memory 1320 through an I/O controller 1335, and a network interface 1330 coupled to the processor and the memory. The network interface 1330 further connected to a communication network 1305. Servers may be clustered together to handle more subject traffic and may include separate servers for different functions such as a database server, an application server, and a Web presentation server. Such servers may further include one or more mass storage devices 1325 such as a disk farm or a redundant array of independent disk ("RAID") system for additional storage and data integrity. Read-only devices, such as compact disk drives and digital versatile disk drives, may also be connected to the servers. Suitable servers and mass storage devices are manufactured by, for example, Compaq, IBM, and Sun Microsystems. Generally, a server may operate as a source of content and provide any associated back-end processing, while an end user can be consumer of content provided by the server. However, it should be appreciated that many of the devices described above may be configured to respond to remote requests, thus operating as a server, and the devices described as servers may operate as end users of remote data sources. In contemporary peer-to-peer networks and environments such as RSS environments, the distinction between end users and servers is a blur. Accordingly, as used herein, the term "server" as used herein is generally intended to refer to any of the above-described servers, or any other device that may be used to provide content such as RSS feeds in a networked environment.

What is claimed is:

1. A computer-implemented method comprising:
   receiving, from a client device, an input dataset comprising of a first set of individual identifiers (IDs) and a first set of attributes corresponding to a first audience, wherein the first audience is composed of a first set of individuals tagged as belonging to a type of audience;
   receiving, from a client device, one or more specified constraints associated with one or more content items;
   accessing a reference-audience data set corresponding to one or more reference audiences composed of a second set of individuals, wherein the reference-audience data set includes a second set of individual IDs and a second set of attributes;
   identifying an expanded audience comprising of a subset of the reference-audience data set that corresponds to a subset of the second set of individuals, wherein a size of the subset depends on an extent to which at least part of the reference-audience data set accords with at least part of the input dataset, the expanded audience being identified by a join operation between the first set of individual identifiers and the second set of individual identifiers in the reference-audience data set to augment the input dataset with individual characteristics data of matched individuals;

generating an engagement score for each individual in the first audience;

assigning the first set of individuals in the first audience to a tier category from a set of tier categories based on whether the engagement score for an individual satisfies a threshold value associated with the tier category, wherein the threshold value is identified based on analysis of the engagement score generated by a machine learning model;

identifying a predicted return for one or more content items on the expanded audience by using an objective function based on the one or more specified constraints; and outputting, to the client device, a result that includes the predicted return and/or the expanded audience.

2. The computer-implemented method of claim 1, wherein the one or more specified constraints comprises of an indication of a maximum amount to be allocated for one or more content items.

3. The computer-implemented method of claim 1, wherein the one or more specified constraints includes a gain delta comprises of a difference between gain and expense associated with one or more content items.

4. The computer-implemented method of claim 1, further comprising:

computing an engagement score for each individual in the expanded audience, wherein the engagement score is a probability of engagement of an individual with one or more content items.

5. The computer-implemented method of claim 4, further comprising:

identifying, for each individual in the expanded audience, a tier category from a set of tier categories by using a threshold value on an engagement score.

6. The computer-implemented method of claim 1, wherein the objective function is based on difference between gain and expense of content items, engagement score of each individual belonging to the expanded audience or expense of individual engagement with the content items.

7. The computer-implemented method of claim 1, further comprising:

outputting a recommendation comprising of one or more execution parameters for one or more content items, the predicted return on the expanded audience or a tier category of each individual in the subset of the second set of individuals belonging to the expanded audience.

8. A system comprising:

one or more data processors; and a non-transitory computer readable storage medium containing instructions which, when executed on the one or more data processors, cause the one or more data processors to perform actions including:

receiving, from a client device, an input dataset comprising of a first set of individual identifiers (IDs) and a first set of attributes corresponding to a first audience, wherein the first audience is composed of a first set of individuals tagged as belonging to a type of audience;

receiving, from a client device, one or more specified constraints associated with one or more content items;

accessing a reference-audience data set corresponding to one or more reference audiences composed of a second set of individuals, wherein the reference-audience data set includes a second set of individual IDs and a second set of attributes;

identifying an expanded audience comprising of a subset of the reference-audience data set that corresponds to a subset of the second set of individuals, wherein a size of the subset depends on an extent to which at least part of the reference-audience data set accords with at least part of the input dataset, the expanded audience being identified by a join operation between the first set of individual identifiers and the second set of individual identifiers in the reference-audience data set to augment the input dataset with individual characteristics data of matched individuals;

generating an engagement score for each individual in the first audience;

assigning the first set of individuals in the first audience to a tier category from a set of tier categories based on whether the engagement score for an individual satisfies a threshold value associated with the tier category, wherein the threshold value is identified based on analysis of the engagement score generated by a machine learning model;

identifying a predicted return for one or more content items on the expanded audience by using an objective function based on the one or more specified constraints; and outputting, to the client device, a result that includes the predicted return and/or the expanded audience.

9. The system of claim 8, wherein one or more specified constraints comprises of an indication of a maximum amount to be allocated for one or more content items.

10. The system of claim 8, wherein the one or more specified constraints includes a gain delta comprises of a difference between gain and expense associated with one or more content items.

11. The system of claim 8, further comprising:

computing an engagement score for each individual in the expanded audience, wherein the engagement score is a probability of engagement of an individual with one or more content items.

12. The system of claim 8, further comprising:

identifying, for each individual in the expanded audience, a tier category from a set of tier categories by using a threshold value on an engagement score.

13. The system of claim 8, wherein the objective function is based on difference between gain and expense of content items, engagement score of each individual belonging to the expanded audience or expense of individual engagement with the content items.

14. The system of claim 8, further comprising:

outputting a recommendation comprising of one or more execution parameters for one or more content items, the predicted return on the expanded audience or a tier category of each individual in the subset of the second set of individuals belonging to the expanded audience.

15. A computer-program product tangibly embodied in a non-transitory machine-readable storage medium, including instructions configured to cause one or more data processors to perform action including:

receiving, from a client device, an input dataset comprising of a first set of individual identifiers (IDs) and a first set of attributes corresponding to a first audience, wherein the first audience is composed of a first set of individuals tagged as belonging to a type of audience;

receiving, from a client device, one or more specified constraints associated with one or more content items;

accessing a reference-audience data set corresponding to one or more reference audiences composed of a second set of individuals, wherein the reference-audience data set includes a second set of individual IDs and a second set of attributes;

identifying an expanded audience comprising of a subset of the reference-audience data set that corresponds to a subset of the second set of individuals, wherein a size of the subset depends on an extent to which at least part of the reference-audience data set accords with at least part of the input dataset, the expanded audience being identified by a join operation between the first set of individual identifiers and the second set of individual identifiers in the reference-audience data set to augment the input dataset with individual characteristics data of matched individuals;

generating an engagement score for each individual in the first audience;

assigning the first set of individuals in the first audience to a tier category from a set of tier categories based on whether the engagement score for an individual satisfies a threshold value associated with the tier category, wherein the threshold value is identified based on analysis of the engagement score generated by a machine learning model;

identifying a predicted return for one or more content items on the expanded audience by using an objective function based on the one or more specified constraints; and outputting, to the client device, a result that includes the predicted return and/or the expanded audience.

16. The computer-program product of claim 15, wherein one or more specified constraints comprises of an indication of a maximum amount to be allocated for one or more content items.

17. The computer-program product of claim 15, further comprising:

computing an engagement score for each individual in the expanded audience, wherein the engagement score is a probability of engagement of an individual with one or more content items.

18. The computer-program product of claim 15, further comprising:

identifying, for each individual in the expanded audience, a tier category from a set of tier categories by using a threshold value on an engagement score.

19. The computer-program product of claim 15, wherein the objective function is based on difference between gain and expense of content items, engagement score of each individual belonging to the expanded audience or expense of individual engagement with the content items.

20. The computer-program product of claim 15, outputting a recommendation comprising of one or more execution parameters for one or more content items, the predicted return on the expanded audience or a tier category of each individual in the subset of the second set of individuals belonging to the expanded audience.

* * * * *